US012742045B2

(12) United States Patent
Nomura et al.

(10) Patent No.: US 12,742,045 B2
(45) Date of Patent: Sep. 22, 2026

(54) METHOD FOR PRODUCING FLUORINE-CONTAINING COMPOUND AND METHOD FOR PRODUCING SURFACE TREATMENT AGENT

(71) Applicant: AGC Inc., Tokyo (JP)

(72) Inventors: Yoshitaka Nomura, Chiyoda-ku (JP); Makoto Uno, Chiyoda-ku (JP); Hikaru Ono, Chiyoda-ku (JP); Takuya Iwase, Chiyoda-ku (JP)

(73) Assignee: AGC Inc., Tokyo (JP)

( * ) Notice: Subject to any disclaimer, the term of this patent is extended or adjusted under 35 U.S.C. 154(b) by 601 days.

(21) Appl. No.: 18/455,768

(22) Filed: Aug. 25, 2023

(65) Prior Publication Data

US 2023/0399471 A1 Dec. 14, 2023

Related U.S. Application Data

(63) Continuation of application No. PCT/JP2022/008850, filed on Mar. 2, 2022.

(30) Foreign Application Priority Data

Mar. 5, 2021 (JP) ................................. 2021-035322

(51) Int. Cl.
*C08G 77/24* (2006.01)
*B01J 23/72* (2006.01)

(52) U.S. Cl.
CPC .............. *C08G 77/24* (2013.01); *B01J 23/72* (2013.01)

(58) Field of Classification Search
CPC ......... C07C 61/00; C07C 41/30; C07C 43/17; B01J 23/72; B01J 27/10; B01J 27/122; B01J 27/128; C08G 77/24; C08G 77/045; C08G 65/329; C09K 3/18
See application file for complete search history.

(56) References Cited

U.S. PATENT DOCUMENTS

2014/0302332 A1 10/2014 Murotani et al.

FOREIGN PATENT DOCUMENTS

| | | | |
|---|---|---|---|
| JP | 2018-43940 | A | 3/2018 |
| WO | WO 2013/121984 | A1 | 8/2013 |
| WO | WO 2018/228975 | A1 | 12/2018 |
| WO | WO 2019/208503 | A1 | 10/2019 |
| WO | WO-2020/025751 | A1 | 2/2020 |

OTHER PUBLICATIONS

International Search Report issued May 17, 2022 in PCT/JP2022/008850 filed on Mar. 2, 2022 (3 pages).
Umemoto "Electrophilic Perfluoroalkylating Agents", Chem. Rev. 1996, 96, 1757-1777 (22 pages).

*Primary Examiner* — Jafar F Parsa
(74) *Attorney, Agent, or Firm* — Oblon, McClelland, Maier & Neustadt, L.L.P.

(57) ABSTRACT

An object is to provide a method for producing a fluorine-containing compound by using an easily available compound under relatively mild reaction conditions to produce a fluorine-containing compound, and a method for producing a surface treatment agent using the fluorine-containing compound obtained by the production method.

A method for producing a fluorine-containing compound represented by the following formula (C1) or (C2), the method including: reacting a compound represented by the following formula (A1) or (A2) with a compound represented by the following formula (B1).

$G^1$-$L^1$-$CR^1R^2$—$X^1$ Formula (A1)

$X^2$—$CR^3R^4$-$L^2$-$G^2$-$L^3$-$CR^5R^6$—$X^3$ Formula (A2)

$R^{11}$—$MgR^{12}$ Formula (B1)

$G^1$-$L^1$-$CR^1R^2$—$R^{11}$ Formula (C1)

$R^{11}$—$CR^3R^4$-$L^2$-$G^2$-$L^3$-$CR^5R^6$—$R^{11}$ Formula (C2)

where, each reference sign in the formula is as described in the specification.

20 Claims, No Drawings

METHOD FOR PRODUCING FLUORINE-CONTAINING COMPOUND AND METHOD FOR PRODUCING SURFACE TREATMENT AGENT

INCORPORATION BY REFERENCE

This application is based upon and claims the benefit of priority from Japanese Patent Application 2021-35322 filed on Mar. 5, 2021, and PCT application No. PCT/JP2022/008850 filed on Mar. 2, 2022, the disclosure of which is incorporated herein in its entirety by reference.

BACKGROUND

The present invention relates to a method for producing a fluorine-containing compound and a method for producing a surface treatment agent.

Fluorine compounds are used in various fields such as agricultural chemicals, pharmaceuticals, and functional materials, and it is required to synthesize various structures by a simpler method.

Various studies have been made on a method for synthesizing a compound having a structure in which an alkyl group is bonded to a fluoroalkyl group.

For example, Japanese Unexamined Patent Application Publication No. 2018-43940 discloses a method for producing a fluorine-containing compound by adding a perfluoroalkyl bromide to an olefin compound by a radical reaction.

In addition, Teruo Umemoto, "Electrophilic Perfluoroalkylating Agents", Chem. Rev. 1996, 96, 1757-1777 discloses a compound represented by the following formula as an electrophilic perfluoroalkylating agent.

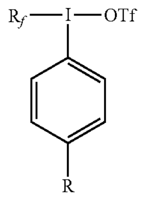

where $R_f$ is n-$C_mF_{2m+1}$, Tf is $SO_2CF_3$, and R is H or F.

Further, Example 1A of International Patent Publication No. WO 2018/228975 describes a reaction of $CF_3(CF_2)_6(CH_2)_2$—I with hexylmagnesium chloride in tetrahydrofuran (THF) in the presence of isoprene.

SUMMARY

The technique of Japanese Unexamined Patent Application Publication No. 2018-43940 is not suitable for synthesis of a compound having a carbon-carbon double bond because an olefin is reacted, and the type of electrophile is limited. In addition, since the product can further undergo a radical reaction to be telomerized, various types of by-products are generated.

In addition, the electrophilic perfluoroalkylating agent of Teruo Umemoto, "Electrophilic Perfluoroalkylating Agents", Chem. Rev. 1996, 96, 1757-1777 as an electrophile requires a multi-step process for synthesis, has a low yield, and is expensive.

In addition, the technique of International Patent Publication No. WO 2018/228975 has a problem that the reactivity decreases as the perfluoroalkyl chain becomes longer and the molecular weight becomes larger. This is considered to be because the perfluoroalkyl chain becomes long and the solubility in the solvent decreases.

An object of the present invention is to provide a method for producing a fluorine-containing compound by using an easily available compound under relatively mild reaction conditions to produce a fluorine-containing compound in good yield, and a method for producing a surface treatment agent using the fluorine-containing compound obtained by the production method.

The present invention provides a method for producing a fluorine-containing compound and a method for producing a surface treatment agent having the following configurations [1] to [10].

[1] A method for producing a fluorine-containing compound represented by the following formula (C1) or (C2), the method comprising: reacting a compound represented by the following formula (A1) or (A2) with a compound represented by the following formula (B1).

$G^1$-$L^1$-$CR^1R^2$—$X^1$ Formula (A1)

$X^2$—$CR^3R^4$-$L^2$-$G^2$-$L^3$-$CR^5R^6$—$X^3$ Formula (A2)

$R^{11}$—$MgR^{12}$ Formula (B1)

$G^1$-$L^1$-$CR^1R^2$—$R^{11}$ Formula (C1)

$R^{11}$—$CR^3R^4$-$L^2$-$G^2$-$L^3$-$CR^5R^6$—$R^{11}$ Formula (C2)

where, in the formula, $G^1$ is a monovalent group having a (poly)oxyfluoroalkylene chain, $G^2$ is a divalent group having a (poly)oxyfluoroalkylene chain, $L^1$, $L^2$, and $L^3$ are each independently a single bond or a divalent organic group, $R^1$, $R^2$, $R^3$, $R^4$, $R^5$, and $R^6$ are each independently a hydrogen atom or an alkyl group having 1 to 6 carbon atoms which may have a substituent, $R^{11}$ is a hydrocarbon group which may have a substituent or a heteroatom, and when there are a plurality of $R^{11}$'s, the $R^{11}$'s may be the same as or different from each other, $R^{12}$ is a halogen atom or a hydrocarbon group which may have a substituent or a heteroatom, and $X^1$, $X^2$, and $X^3$ are each independently a halogen atom.

[2] A method for producing a fluorine-containing compound represented by the following formula (C1) or (C2), the method comprising: reacting a compound represented by the following formula (A3) or (A4) with a compound represented by the following formula (B2).

$G^1$-$L^1$-$CR^1R^2$—$MgR^{12}$ Formula (A3)

$R^{12}Mg$—$CR^3R^4$-$L^2$-$G^2$-$L^3$-$CR^5R^6$—$MgR^{12}$ Formula (A4)

$R^1$—$X^4$ Formula (B2)

$G^1$-$L^1$-$CR^1R^2$—$R^{11}$ Formula (C1)

$R^{11}$—$CR^3R^4$-$L^2$-$G^2$-$L^3$-$CR^5R^6$—$R^{11}$ Formula (C2)

where, in the formula, $G^1$ is a monovalent group having a (poly)oxyfluoroalkylene chain, $G^2$ is a divalent group having a (poly)oxyfluoroalkylene chain, $L^1$, $L^2$, and $L^3$ are each independently a single bond or a divalent organic group, $R^1$, $R^2$, $R^3$, $R^4$, $R^5$, and $R^6$ are each independently a hydrogen atom or an alkyl group having 1 to 6 carbon atoms which may have a substituent, $R^{11}$'s are each independently a hydrocarbon group which may have a substituent or a heteroatom, and when there are a plurality of $R^{12}$'s, the $R^{12}$'s may be the same as or different from each other, $R^{12}$ is a halogen atom or a hydrocarbon group which may have a substituent or a heteroatom, and when there are a plurality of $R^{12}$'s, the $R^{12}$'s may be the same as or different from each other, and $X^4$ is a halogen atom.

[3] A method for producing a fluorine-containing compound represented by the following formula (C1) or (C2), the method comprising: reacting a compound represented by the following formula (A1) or (A2), a compound represented by the following formula (B2), and a compound represented by the following formula (B3) with each other.

$$G^1\text{-}L^1\text{-}CR^1R^2\text{—}X^1 \quad \text{Formula (A1)}$$

$$X^2\text{—}CR^3R^4\text{-}L^2\text{-}G^2\text{-}L^3\text{-}CR^5R^6\text{—}X^3 \quad \text{Formula (A2)}$$

$$R^{11}\text{—}X^4 \quad \text{Formula (B2)}$$

$$R^{14}\text{—}CR^{15}R^{16}\text{—}MgR^{12} \quad \text{Formula (B3)}$$

$$G^1\text{-}L^1\text{-}CR^1R^2\text{—}R^{11} \quad \text{Formula (C1)}$$

$$R^{11}\text{—}CR^3R^4\text{-}L^2\text{-}G^2\text{-}L^3\text{-}CR^5R^6\text{—}R^{11} \quad \text{Formula (C2)}$$

where, in the formula, $G^1$ is a monovalent group having a (poly)oxyfluoroalkylene chain, $G^2$ is a divalent group having a (poly)oxyfluoroalkylene chain, $L^1$, $L^2$, and $L^3$ are each independently a single bond or a divalent organic group, $R^1$, $R^2$, $R^3$, $R^4$, $R^5$, and $R^6$ are each independently a hydrogen atom or an alkyl group having 1 to 6 carbon atoms which may have a substituent, $R^{11}$'s are each independently a hydrocarbon group which may have a substituent or a heteroatom, and when there are a plurality of $R^{11}$'s, the $R^{11}$'s may be the same as or different from each other, $R^{12}$ is a halogen atom or a hydrocarbon group which may have a substituent or a heteroatom, $R^{14}$, $R^{15}$, and $R^{16}$ are each independently a hydrogen atom or a hydrocarbon group which may have a substituent or a heteroatom, and $X^1$, $X^2$, $X^3$, and $X^4$ are each independently a halogen atom.

[4] The method for producing a fluorine-containing compound according to any one of [1] to [3], in which at least one of the $L^1$-$CR^1R^2$, the $L^2$-$CR^3R^4$, and the $L^3$-$CR^5R^6$ is represented by $(CR^7R^8\text{—}CR^9R^{10})_{n1}$, where, in the formula, $R^7$, $R^8$, $R^9$, and $R^{10}$ are each independently a hydrogen atom or an alkyl group having 1 to 6 carbon atoms which may have a substituent, and when there are a plurality of $R^7$'s, $R^8$'s, $R^9$'s, and $R^{10}$'s, the $R^7$'s, $R^8$'s, $R^9$'s, and $R^{10}$'s may be the same as or different from each other, and n1 is an integer of 1 to 20.

[5] The method for producing a fluorine-containing compound according to any one of [1] to [4], in which at least one of the $L^1$-$CR^1R^2$, the $L^2$-$CR^3R^4$, and the $L^3$-$CR^5R^6$ is represented by $(CH_2CH_2)_{n2}$, where, in the formula, n2 is an integer of 1 to 20.

[6] The method for producing a fluorine-containing compound according to any one of [1] to [5], in which the $R^{11}$ is represented by the following formula (D1).

$$(CH_2\text{=}CH\text{—}R^{21}\text{—})_a(R^{22}\text{—})_{3\text{-}a}C\text{—}R^{23}\text{—}* \quad \text{Formula (D1)}$$

where, in the formula, $R^{21}$ is a single bond or an alkylene group which may have a fluorine atom having 1 to 18 carbon atoms, and when there are a plurality of $R^{21}$'s, the $R^{21}$'s may be the same as or different from each other, $R^{22}$ is a hydrogen atom or an alkyl group which may have a fluorine atom having 1 to 10 carbon atoms, and when there are a plurality of $R^{22}$'s, the $R^{22}$'s may be the same as or different from each other, $R^{23}$ is a single bond or an alkylene group having 1 to 19 carbon atoms, a is an integer of 1 to 3, and

* is an atomic bond.

[7] The method for producing a fluorine-containing compound according to any one of [1] to [6], in which at least one of the $X^1$, $X^2$, $X^3$, and $X^4$ is an iodine atom.

[8] The method for producing a fluorine-containing compound according to any one of [1] to [7], in which the reaction is performed in the presence of a transition metal compound.

[9] The method for producing a fluorine-containing compound according to [8], in which the transition metal compound contains one or more elements selected from Cu, Ni, Pd, and Co.

[10] A method for producing a surface treatment agent, including: producing a fluorine-containing compound represented by the formula (C1) or (C2) by the production method according to any one of [1] to [9]; and introducing a reactive silyl group into the fluorine-containing compound.

The above and other objects, features and advantages of the present disclosure will become more fully understood from the detailed description given hereinbelow which are given by way of illustration only, and thus are not to be considered as limiting the present disclosure.

According to the present invention, it is possible to provide a method for producing a fluorine-containing compound by using an easily available compound under relatively mild reaction conditions to produce a fluorine-containing compound, and a method for producing a surface treatment agent using the fluorine-containing compound obtained by the production method.

DESCRIPTION OF EMBODIMENTS

In the present specification, the compound represented by the formula (A1) is referred to as a compound (A1). The same applies to compounds represented by other formulae and the like.

The "(poly)oxyfluoroalkylene" is a generic term for oxyfluoroalkylene and polyoxyfluoroalkylene.

The fluoroalkyl group is a generic term for a combination of a perfluoroalkyl group and a partial fluoroalkyl group. The perfluoroalkyl group means a group in which all hydrogen atoms of the alkyl group are substituted with fluorine atoms. In addition, the partial fluoroalkyl group is an alkyl group in which one or more hydrogen atoms are substituted with a fluorine atom and which has one or more hydrogen atoms. That is, the fluoroalkyl group is an alkyl group having one or more fluorine atoms.

The "reactive silyl group" is a generic term for a hydrolyzable silyl group and a silanol group (Si—OH), and the "hydrolyzable silyl group" means a group capable of forming a silanol group by a hydrolysis reaction.

The "organic group" means a hydrocarbon group which may have a substituent or a heteroatom or other bonds in a carbon chain. The "hydrocarbon group" is a group including an aliphatic hydrocarbon group (linear alkylene group, branched alkylene group, cycloalkylene group, and the like), an aromatic hydrocarbon group (phenylene group and the like), and a combination thereof.

The "surface layer" means a layer formed on the surface of the substrate.

"to" indicating a numerical range means that the numerical values stated before and after "to" are included as a lower limit value and an upper limit value.

[Method for Producing Fluorine-Containing Compound]

The method for producing a fluorine-containing compound of the present invention (hereinafter also referred to as the present production method) is a preferred production method capable of introducing any substituent into a compound having a (poly)oxyfluoroalkylene chain by subjecting an organohalogen compound having a (poly)oxyfluoroalkylene chain (compound (A1) and compound (A2)), an organomagnesium compound having a (poly)oxyfluoroalkylene chain (compound (A3) and compound (A4)), and a specific organomagnesium compound or organohalogen compound to a coupling reaction.

In the present production method, a compound having a (poly)oxyfluoroalkylene chain is used as a reactive base material. In a compound having a long-chain perfluoroalkyl group, the reaction hardly proceeds due to poor solubility, but it is presumed that the solubility is improved and the reactivity is increased by using a compound having an ether chain.

According to the present production method, even a compound having a relatively high molecular weight (long chain) (poly)oxyfluoroalkylene chain has high reaction efficiency, and the yield of a target product can be increased while suppressing the reaction temperature and reaction time. For example, according to the present production method, even a compound having a (poly)oxyfluoroalkylene chain having a molecular weight of 200 to 30,000 can be suitably produced as a target product. In addition, according to the present production method, for example, a fluorine-containing compound having a molecular weight of 1,000 to 30,000 can be suitably produced.

Hereinafter, three production methods belonging to the present production method will be described in more detail.

<First Production Method>

A first production method of a fluorine-containing compound of the present invention is a method for producing a fluorine-containing compound represented by the following formula (C1) or (C2), the method including: reacting a compound represented by the following formula (A1) or (A2) with a compound represented by the following formula (B1).

$G^1\text{-}L^1\text{-}CR^1R^2—X^1$ Formula (A1)

$X^2—CR^3R^4\text{-}L^2\text{-}G^2\text{-}L^3\text{-}CR^5R^6—X^3$ Formula (A2)

$R^{11}—MgR^{12}$ Formula (B1)

$G^1\text{-}L^1\text{-}CR^1R^2—R^{11}$ Formula (C1)

$R^{11}—CR^3R^4\text{-}L^2\text{-}G^2\text{-}L^3\text{-}CR^5R^6—R^{11}$ Formula (C2)

where, in the formula, $G^1$ is a monovalent group having a (poly)oxyfluoroalkylene chain, $G^2$ is a divalent group having a (poly)oxyfluoroalkylene chain, $L^1$, $L^2$, and $L^3$ are each independently a single bond or a divalent organic group, $R^1$, $R^2$, $R^3$, $R^4$, $R^5$, and $R^6$ are each independently a hydrogen atom or an alkyl group having 1 to 6 carbon atoms which may have a substituent, $R^{11}$ is a hydrocarbon group which may have a substituent or a heteroatom, and when there are a plurality of $R^{11}$'s, the $R^{11}$'s may be the same as or different from each other, $R^{12}$ is a halogen atom or a hydrocarbon group which may have a substituent or a heteroatom, and $X^1$, $X^2$, and $X^3$ are each independently a halogen atom.

The first production method is a method of synthesizing the compound (C1) or the compound (C2) by subjecting the compound (A1) or the compound (A2) that is an organohalogen compound and the compound (B1) that is an organomagnesium compound to a coupling reaction.

Although there is a presumable part in the reaction route of the present reaction, it is presumed that T of the compound (A1) or the compound (A2) and $MgR^{12}$ of the compound (B1) undergo an exchange reaction in a reaction system (in a solvent), and the coupling reaction proceeds while producing the compound (A3) or the compound (A4) and the compound (B2) in the second production method, which will be described later, whereby the compound (C1) or the compound (C2) is synthesized.

The monovalent group having a (poly)oxyfluoroalkylene chain in $G^1$ is a fluoroalkyl group having —O— at a terminal bonded to $L^1$ (when $L^1$ is a single bond, $CR^1R^2$), —O— between carbon-carbon atoms of a carbon chain having 2 or more carbon atoms, or both of them. From the viewpoint of ease of production and the like, $G^1$ preferably has a structure represented by the following formula (G1-1).

$R^{f0}O—[(R^{f1}O)_{m1}(R^{f2}O)_{m2}(R^{f3}O)_{m3}(R^{f4}O)_{m4}(R^{f5}O)_{m5}(R^{f6}O)_{m6}]—(R^{f7})_{m7}—$ Formula (G1-1)

where $R^{f0}$ is a fluoroalkyl group having 1 to 20 carbon atoms, $R^{f1}$ is a fluoroalkylene group having 1 carbon atom, $R^{f2}$ is a fluoroalkylene group having 2 carbon atoms, $R^{f3}$ is a fluoroalkylene group having 3 carbon atoms, $R^{f4}$ is a fluoroalkylene group having 4 carbon atoms, $R^{f5}$ is a fluoroalkylene group having 5 carbon atoms, $R^{f6}$ is a fluoroalkylene group having 6 carbon atoms, $R^{f7}$ is a fluoroalkylene group having 1 to 6 carbon atoms, m1, m2, m3, m4, m5, and m6 each independently represent an integer of 0 or 1 or more, m7 is an integer of 0 or 1, and m1+m2+m3+m4+m5+m6 is an integer of 1 to 200. When the obtained compound (C1) is used as a surface treatment agent or a raw material thereof, m1+m2+m3+m4+m5+m6 is an integer of 1 to 200, that is, $G^1$ is preferably a polyoxyfluoroalkylene chain from the viewpoint of water/oil repellency, fingerprint removability, and the like.

Note that the bonding order of $(R^{f1}O)$ to $(R^{f6}O)$ in the formula (G1-1) is random.

m1 to m6 in the formula (G1-1) represent the number of $(R^{f1}O)$ to $(R^{f6}O)$, respectively, and do not represent arrangement. For example, $(R^{f5}O)_{m5}$ represents that the number of $(R^{f5}O)$ is m5, and does not represent a block arrangement structure of $(R^{f5}O)_{m5}$. Similarly, the order of description of $(R^{f1}O)$ to $(R^{f6}O)$ does not represent the bonding order of the respective units.

When m7 is 0, the terminal of $G^1$ bonded to $L^1$ (when $L^1$ is a single bond, $CR^1R^2$) is —O—. When m7 is 1, the terminal of $G^1$ bonded to $L^1$ (when $L^1$ is a single bond, $CR^1R^2$) is a carbon atom (carbon atom at the terminal of $R^{f7}$).

In addition, the fluoroalkylene group having 3 to 6 carbon atoms may be a linear fluoroalkylene group or a fluoroalkylene group having a branched or ring structure.

Specific examples of $R^{f1}$ include $—CF_2—$ and $—CHF—$.

Specific examples of $R^{f2}$ include-$CF_2CF_2—$, $—CHFCF_2—$, $—CHFCHF—$, $—CH_2CF_2—$, and $—CH_2CHF—$.

Specific examples of $R^{f3}$ include $—CF_2CF_2CF_2—$, $—CF_2CHFCF_2—$, $—CF_2CH_2CF_2—$, $—CHFCF_2CF_2—$, $—CHFCHFCF_2—$, $—CHFCHFCHF—$, $—CHFCH_2CF_2—$, $—CH_2CF_2CF_2—$, $—CH_2CHFCF_2—$, $—CH_2CH_2CF_2—$, $—CH_2CF_2CHF—$, $—CH_2CHFCHF—$, $—CH_2CH_2CHF—$, $—CF(CF_3)—CF_2—$, $—CF(CHF_2)—CF_2—$, $—CF(CH_2F)—CF_2—$, $—CF(CH_3)—CF_2—$, $—CF(CF_3)—CHF—$, $—CF(CHF_2)—CHF—$, $—CF(CH_2F)—CHF—$, $—CF(CH_3)—CHF—$, $—CF(CF_3)—CH_2—$, $—CF(CHF_2)—CH_2—$, $—CF(CH_2F)—CH_2—$, $—CF(CH_3)—CH_2—$, $—CH(CF_3)—CF_2—$, $—CH(CHF_2)—CF_2—$, $—CH(CH_2F)—CF_2—$, $—CH(CH_3)—CF_2—$, $—CH(CF_3)—CHF—$, $—CH(CHF_2)—CHF—$, $—CH(CH_2F)—CHF—$, $—CH(CH_3)—CHF—$, $—CH(CF_3)—CH_2—$, $—CH(CHF_2)—CH_2—$, and $—CH(CH_2F)—CH_2—$.

Specific examples of $R^{f4}$ include $—CF_2CF_2CF_2CF_2—$, $—CHFCF_2CF_2CF_2—$, $—CH_2CF_2CF_2CF_2—$, $—CF_2CHFCF_2CF_2—$, $—CHFCHFCF_2CF_2—$, $—CH_2CHFCF_2CF_2—$, $—CF_2CH_2CF_2CF_2—$, $—CHFCH_2CF_2CF_2—$, $—CH_2CH_2CF_2CF_2—$, $—CHFCF_2CHFCF_2—$, $—CH_2CF_2CHFCF_2—$, $—CF_2CHFCHFCF_2—$, $—CHFCHFCHFCF_2—$, $—CH_2CHFCHFCF_2—$, $—CF_2CH_2CHFCF_2—$, $—CHFCH_2CHFCF_2—$, $—CH_2CH_2CHFCF_2—$, $—CF_2CH_2CH_2CF_2—$, $—CHFCH_2CH_2CF_2—$, $—CH_2CH_2CH_2CF_2—$, $—CHFCH_2CH_2CHF—$, $—CH_2CH_2CH_2CHF—$, and -cyclo$C_4F_6$—.

Specific examples of $R^{f5}$ include $—CF_2CF_2CF_2CF_2CF_2—$, $—CHFCF_2CF_2CF_2CF_2—$, $—CH_2CHFCF_2CF_2CF_2—$, $—CF_2CHFCF_2CF_2CF_2—$, $—CHFCHFCF_2CF_2CF_2—$, $—CF_2CH_2CF_2CF_2CF_2—$, $—CHFCH_2CF_2CF_2CF_2—$, $—CH_2CH_2CF_2CF_2CF_2—$, $—CF_2CF_2CHFCF_2CF_2—$, $—CHFCF_2CHFCF_2CF_2—$, $—CH_2CF_2CHFCF_2CF_2—$, $—CH_2CF_2CF_2CF_2CH_2—$, and -cyclo$C_5F_8$—.

Specific examples of $R^{f6}$ include $—CF_2CF_2CF_2CF_2CF_2CF_2—$, $—CF_2CF_2CHFCHFCF_2CF_2—$, $—CHFCF_2CF_2CF_2CF_2CF_2—$, $—CHFCHFCHFCHFCHFCHF—$, $—CHFCF_2CF_2CF_2CF_2CH_2—$, $—CH_2CF_2CF_2CF_2CF_2CH_2—$, and -cyclo$C_6F_{10}$—.

In addition, specific examples of $R^{f0}$ and $R^{f1}$ include the same ones as those mentioned in the above $R^{f1}$ to $R^{f6}$.

Here, -cyclo$C_4F_6$— means a perfluorocyclobutanediyl group, and specific examples thereof include a perfluorocyclobutane-1,2-diyl group. -cyclo$C_5F_8$-means a perfluorocyclopentanediyl group, and specific examples thereof include a perfluorocyclopentane-1,3-diyl group. -cyclo$C_6F_{10}$— means a perfluorocyclohexanediyl group, and specific examples thereof include a perfluorocyclohexane-1,4-diyl group.

When the obtained compound (C1) is used as a surface treatment agent or a raw material thereof, $G^1$ preferably has a structure represented by the following formulae (F1) to (F3) from the viewpoint of further excellent water/oil repellency, friction resistance, and fingerprint dirt removability.

$$(R^{f1}O)_{m1}—(R^{f2}O)_{m2} \quad \text{Formula (F1)}$$

$$(R^{f2}O)_{m2}—(R^{f4}O)_{m4} \quad \text{Formula (F2)}$$

$$(R^{f3}O)_{m3} \quad \text{Formula (F3)}$$

where, each reference sign of the formulae (F1) to (F3) is the same as those in the formula (G1-1).

In the formulae (F1) and (F2), the bonding order of $(R^{f1}O)$ and $(R^{f2}O)$, and $(R^{f2}O)$ and $(R^{f4}O)$ is random. For example, $(R^{f1}O)$ and $(R^{f2}O)$ may be alternately arranged, $(R^{f1}O)$ and $(R^{f2}O)$ may be each arranged in a block, or may be random. The same applies to the formula (F3).

In the formula (F1), m1 is preferably 1 to 50, more preferably 1 to 40, still more preferably 1 to 30, and particularly preferably 1 to 20. In addition, m2 is preferably 1 to 50, more preferably 1 to 40, still more preferably 1 to 30, and particularly preferably 1 to 20.

In the formula (F2), m2 is preferably 1 to 50, more preferably 1 to 40, still more preferably 1 to 30, and particularly preferably 1 to 20. In addition, m4 is preferably 1 to 50, more preferably 1 to 40, still more preferably 1 to 30, and particularly preferably 1 to 20.

In the formula (F3), m3 is preferably 1 to 50, more preferably 1 to 40, still more preferably 1 to 30, and particularly preferably 1 to 20.

The divalent group having a (poly)oxyfluoroalkylene chain in $G^2$ is a fluoroalkylene group having —O— at two terminals bonded to $L^2$ or $L^3$ (when $L^2$ or $L^3$ is a single bond, $CR^3R^4$ or $CR^5R^6$) each independently, or —O— between carbon-carbon atoms of a carbon chain having 2 or more carbon atoms, or is a combination thereof in the formula (A2). From the viewpoint of ease of production and the like, $G^2$ preferably has a structure represented by the following formula (G2-1).

$$—(O)_{m0}—[(R^{f1}O)_{m1}(R^{f2}O)_{m2}(R^{f3}O)_{m3}(R^{f4}O)_{m4}(R^{f5}O)_{m5}(R^{f6}O)_{m6}]—(R^{f7})_{m7}— \quad \text{Formula (G2-1)}$$

Here, m0 is an integer of 0 or 1, and $R^{f1}$, $R_{f2}$, $R^{f3}$, $R^{f4}$, $R^{f5}$, $R^{f6}$, $R^{f7}$, m1, m2, m3, m4, m5, m6, and m7 are the same as those in the $G^1$. Note that the bonding order of $(R^{f1}O)$ to $(R^{f6}O)$ in the formula (G2-1) is random and is as described in the above formula (G1-1).

When m7 is 0, one terminal of $G^2$ bonded to $L^3$ (when $L^3$ is a single bond, $CR^5R^6$) is —O—. When m7 is 1, one terminal of $G^2$ bonded to $L^3$ (when $L^3$ is a single bond, $CR^5R^6$) is a carbon atom (carbon atom at the terminal of $R^f$). In addition, when m0 is 1, one terminal of $G^2$ bonded to $L^2$ (when $L^2$ is a single bond, $CR^3R^4$) is —O—. When m0 is 0, one terminal of $G^2$ bonded to $L^2$ (when $L^2$ is a single bond, $CR^3R^4$) is a carbon atom (carbon atom at any terminal of $R^{f1}$ to $R^{f7}$). Note that m0 and m7 are each independently 0 or 1.

When the obtained compound (C2) is used as a surface treatment agent or a raw material thereof, m1+m2+m3+m4+m5+m6 is an integer of 1 to 200, that is, $G^2$ is preferably a polyoxyfluoroalkylene chain from the viewpoint of water/oil repellency, fingerprint removability, and the like.

When the obtained compound (C2) is used as a surface treatment agent or a raw material thereof, $G^2$ preferably has a structure represented by the following formulae (F4) to (F6) from the viewpoint of further excellent water/oil repellency, friction resistance, and fingerprint dirt removability.

$$—(O)_{m0}—(R^{f1}O)_{m1}—(R^{f2}O)_{m2} \quad \text{Formula (F4)}$$

$$—(O)_{m0}—(R^{f2}O)_{m2}—(R^{f4}O)_{m4} \quad \text{Formula (F5)}$$

$$—(O)_{m0}—(R^{f3}O)_{m3} \quad \text{Formula (F6)}$$

where, each reference sign of the formulae (F4) to (F6) is the same as those in the formula (G2-1).

In the formulae (F4) and (F5), the bonding order of ($R^{f1}O$) and ($R^{f2}O$), and ($R^{f2}O$) and ($R^{f4}O$) is random. For example, ($R^{f1}O$) and ($R^{f2}O$) may be alternately arranged, ($R^{f1}O$) and ($R^{f2}O$) may be each arranged in a block, or may be random. The same applies to the formula (F6).

In the formula (F4), m1 is preferably 1 to 50, more preferably 1 to 40, still more preferably 1 to 30, and particularly preferably 1 to 20. In addition, m2 is preferably 1 to 50, more preferably 1 to 40, still more preferably 1 to 30, and particularly preferably 1 to 20.

In the formula (F5), m2 is preferably 1 to 50, more preferably 1 to 40, still more preferably 1 to 30, and particularly preferably 1 to 20. In addition, m4 is preferably 1 to 50, more preferably 1 to 40, still more preferably 1 to 30, and particularly preferably 1 to 20.

In the formula (F6), m3 is preferably 1 to 50, more preferably 1 to 40, still more preferably 1 to 30, and particularly preferably 1 to 20.

The ratio of fluorine atoms in the (poly)oxyfluoroalkylene chain [{number of fluorine atoms/(number of fluorine atoms+number of hydrogen atoms)}×100(%)] in $G^1$ and $G^2$ is preferably 40% or more, more preferably 50% or more, and still more preferably 60% or more from the viewpoint of excellent water/oil repellency and fingerprint removability.

In addition, the molecular weight of the (poly)oxyfluoroalkylene chain part is preferably 200 to 30,000, more preferably 600 to 25,000, and still more preferably 1,000 to 20,000 from the viewpoint of wear resistance.

$L^1$, $L^2$, and $L^3$ are each independently a single bond or a divalent organic group. Examples of the organic group in $L^1$, $L^2$, and $L^3$ include a hydrocarbon group which may have a substituent or a heteroatom or other bonds ($B^1$) in the carbon chain.

Examples of the hydrocarbon group include an aliphatic hydrocarbon group (linear alkylene group, branched alkylene group, cycloalkylene group, and the like), an aromatic hydrocarbon group (phenylene group and the like), and a group consisting of combination thereof. The aliphatic hydrocarbon group may have a double bond or a triple bond in the carbon chain. Examples of the combination include a group in which an alkylene group and an arylene group are directly linked via a heteroatom or other bonds.

Examples of the substituent that the hydrocarbon group may have include a halogen atom, a hydroxy group, an amino group, a nitro group, and a sulfo group, and from the viewpoint of the stability of the compound in the present production method, a halogen atom is preferable. Examples of the halogen atom include a fluorine atom, a chlorine atom, and a bromine atom.

Specific examples of the heteroatom or other bonds ($B^1$) include $—C(O)NR^{26}—$, $—C(O)O—$, $—C(O)—$, $—O—$, $—NR^{26}—$, $—S—$, $—OC(O)O—$, $—NHC(O)O—$, $—NHC(O)NR^{26}—$, $—SO_2NR^{26}—$, $—Si(R^{26})_2—$, $—OSi(R^{26})_2—$, $—Si(CH_3)_2\text{-Ph-}Si(CH_3)_2—$, and a divalent organopolysiloxane residue. Here, $R^{26}$ is a hydrogen atom, an alkyl group having 1 to 6 carbon atoms, or a phenyl group, and Ph is a phenylene group. From the viewpoint of ease of production of the present compound, the number of carbon atoms in the alkyl group of $R^{26}$ is preferably 1 to 3, and particularly preferably 1 and 2.

Specific examples of $L^1$, $L^2$, and $L^3$ include a single bond, an alkylene group $R^{28}$ which may have a substituent, and a combination of an alkylene group $R^{28}$ which may have a substituent and the $B^1$ (for example, $—R^{28}—B^1—$, $—B^1—R^{28}—B^1—$, and $—R^{28}—B^1—R^{28}—$).

$R^1$, $R^2$, $R^3$, $R^4$, $R^5$, and $R^6$ are each independently a hydrogen atom or an alkyl group having 1 to 6 carbon atoms which may have a substituent. Examples of the alkyl group include a linear or branched alkyl group. Examples of the substituent that the alkyl group may have include a halogen atom, a hydroxy group, an amino group, a nitro group, and a sulfo group, and from the viewpoint of the stability of the compound in the present production method, a halogen atom is preferable. Examples of the halogen atom include a fluorine atom, a chlorine atom, and a bromine atom. Among them, the halogen atom is preferably a fluorine atom from the viewpoint of stability. Specific examples of the alkyl group which may have a substituent include $CH_3—$, $CH_2F—$, $CHF_2—$, $CF_3—$, $CH_3CH_2—$, $CF_3CH_2—$, $CF_3CF_2—$, $CH_3CH_2CH_2—$, $CF_3CH_2CH_2—$, $CF_3CF_2CH_2—$, $CF_3CF_2CF_2—$, $CH_3CH(CH_3)—$, $CF_3CH(CH_3)—$, $CF_3CH(CF_3)—$, $CF_3CF(CF_3)—$, $CH_3CH_2CH_2CH_2—$, $CF_3CF_2CF_2CF_2—$, $CH_3CH_2CH(—CH_2CH_3)—$, $CF_3CF_2CF(—CF_2CF_3)—$, $CH_3CH_2CH_2CH(—CH_2CH_3)—$, and $CF_3CF_2CF_2CF(—CF_2CF_3)—$. In addition, the alkyl groups which may have substituents of $R^1$, $R^2$, $R^3$, $R^4$, $R^5$, and $R^6$ may be the same as or different from each other.

$R^1$, $R^2$, $R^3$, $R^4$, $R^5$, and $R^6$ are preferably a hydrogen atom from the viewpoint of reactivity.

In the present production method, at least one of $L^1\text{-}CR^1R^2$, $L^2\text{-}CR^3R^4$, and $L^3\text{-}CR^5R^6$ in the compound (A1) or the compound (A2) preferably has a structure represented by $(CR^7R^8—CR^9R^{10})_{n1}$ from the viewpoint of ease of synthesis of raw materials, reactivity with the compound (A1), the compound (A2), and the compound (B2), and the like.

where, in the formula, $R^7$, $R^8$, $R^9$, and $R^{10}$ are each independently a hydrogen atom or an alkyl group having 1 to 6 carbon atoms which may have a substituent, and when there are a plurality of $R^7$'s, $R^8$'s, $R^9$'s, and $R^{10}$'s, the $R^7$'s, $R^8$'s, $R^9$'s, and $R^{10}$'s may be the same as or different from each other, and n1 is an integer of 1 to 20.

For example, when $L^1\text{-}CR^1R^2$ is $(CR^7R^8—CR^9R^{10})_{n1}$, the compound (A1) is represented by the following formula (A1a). In addition, for example, when $L^2\text{-}CR^3R^4$ and $L^3\text{-}CR^5R^6$ are $(CR^7R^8—CR^9R^{10})_{n1}$, the compound (A2) is represented by the following formula (A2a). Further, the compound (A3), the compound (A4), the compound (C1), the compound (C2), and the like, which will be described later, also follow this.

$$G^1\text{-}(CR^7R^8—CR^9R^{10})_{n1}—X^1 \qquad \text{Formula (A1a)}$$

$$X^2—(CR^9R^{10}—CR^7R^8)_{n1}\text{-}L^2\text{-}G^2\text{-}(CR^7R^8—CR^9R^{10})_{n1}—X^3 \qquad \text{Formula (A2a)}$$

The alkyl group in $R^7$, $R^8$, $R^9$, and $R^{10}$ is the same as that in $R^1$ to $R^6$. Among them, from the viewpoint of reactivity, it is preferable that $R^9$ and $R^{10}$ be a hydrogen atom, that is, $(CR^7R^8—CR^9R^{10})_{n1}$ is a group represented by $(CR^7R^8—CH_2)_{n1}$. In addition, in $(CR^7R^8—CH_2)_{n1}$, the atomic bond of "$CH_2$" is bonded to $X^1$, $X^2$, or $X^3$ of the compound (A1) or the compound (A2). When the compound (A1) and the compound (A2) have the structure of "$—CH_2—X^{11}$" (where $X^{11}$ is $X^1$, $X^2$, or $X^3$), the reactivity of coupling in the present production method is improved.

Examples of the halogen atom in $X^1$, $X^2$, and $X^3$ include a fluorine atom, a chlorine atom, a bromine atom, and an iodine atom, and an iodine atom is preferable from the viewpoint of further improving the reactivity.

Specific examples of $(CR^7R^8—CH_2)_{n1}$ include $CH_2CH_2$, $CH_2CH_2CH_2CH_2$, $CH_2CH_2CH_2CH_2CH_2CH_2$, $CH(—CH_3)$ $CH_2$, $CH(—CF_3)CH_2$, $CH(—CH_2F)CH_2$, $CH(—CHF_2)CH_2$, $C(—CH_3)(—CH_3)CH_2$, $C(—CF_3)(—CF_3)CH_2$, $C(—CH_2CH_3)(—CH_2CH_3)CH_2$, $C(—CF_2CF_3)(—CF_2CF_3)CH_2$, $C(—CH_2CH_2CH_3)(—CH_2CH_2CH_3)CH_2$, $C(—CF_2CF_2CF_3)(—CF_2CF_2CF_3)CH_2$, $C(—CH_2CH_2CH_2CH_3)(—CH_2CH_2CH_2CH_3)CH_2$, $C(—CF_2CF_2CF_2CF_3)(—CF_2CF_2CF_2CF_3)CH_2$, $C(—CH_2CH_2CH_2CH_2CH_3)(—CH_2CH_2CH_2CH_2CH_3)CH_2$, $C(—CF_2CF_2CF_2CF_2CF_3)(—CF_2CF_2CF_2CF_2CF_3)CH_2$, $C(—CH_2CH_2CH_2CH_2CH_2CH_3)(—CH_2CH_2CH_2CH_2CH_2CH_3)CH_2$, and $C(—CF_2CF_2CF_2CF_2CF_2CF_3)(—CF_2CF_2CF_2CF_2CF_2CF_3)CH_2$.

Furthermore, in the present production method, particularly $R^7$ is a hydrogen atom, $R^8$ is preferably a hydrogen atom or a methyl group, and both $R^7$ and $R^8$ are more preferably a hydrogen atom, from the viewpoint of ease of synthesis of raw materials, reactivity with the compound (A1), the compound (A2), and the compound (B2), and the like. That is, at least one of $L^1$-$CR^1R^2$, $L^2$-$CR^3R^4$, and $L^3$-$CR^5R^6$ in the compound (A1) or the compound (A2) preferably has a structure represented by $(CH_2CH_2)_{n2}$. However, n2 is an integer of 1 to 20, preferably 1 to 12, and more preferably 1 to 6.

Preferred specific examples of the compound (A1) and the compound (A2) include the following compounds.

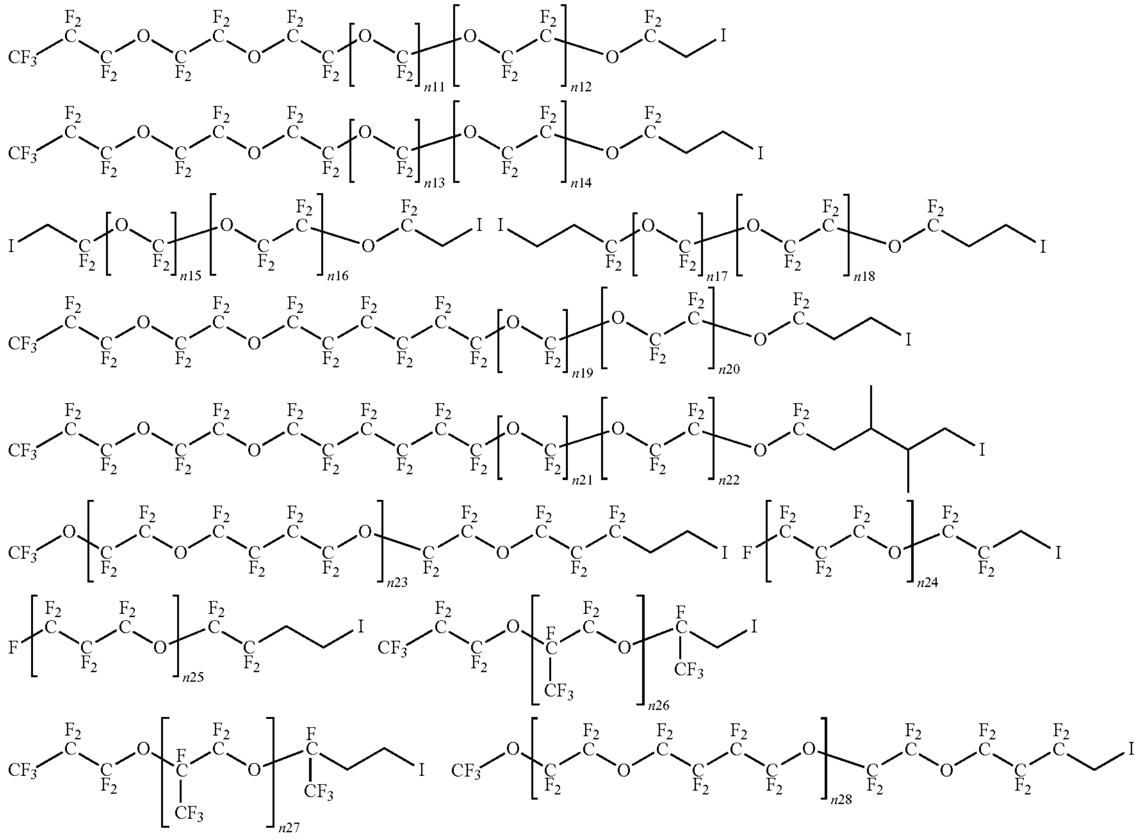

where, n11 to n28 represent the number of repeating units, and each independently represent an integer of 1 to 200.

The compound (A1) and the compound (A2) can be produced, for example, by a method of reacting the compound represented by the following formulae (A1-2) and (A2-2) with triphenylphosphine and iodomethane to iodinate the compound, a method of reacting the compound with triphenylphosphine and iodine to iodinate the compound, or the like. In addition, a commercially available product having a desired structure may be used.

$G^1$-$L^1$-$CR^1R^2$—OH    Formula (A1-2)

HO—$CR^3R^4$-$L^2$-$G^2$-$L^3$-$CR^5R^6$—OH    Formula (A2-2)

where, each reference sign in the formula is as described above.

In addition, as an example of synthesis of the compound (A1), a compound represented by the following formula (A1-3) or the like can also be produced by adding an initiator, a metal catalyst, an organic catalyst or the like, and ethylene to the following formula (A1-4) and reacting them.

$G^1$-$L^1$-$CH_2CH_2$—$X^1$    Formula (A1-3)

$G^1$-$L^1$-$X^1$    Formula (A1-4)

In addition, the initiator, the metal catalyst, and the organic catalyst can be appropriately selected from known initiators and used. Examples of the initiator include an azo-based initiator, an organic peroxide, and a redox initiator. Examples of the metal catalyst include simple metals such as copper and iron, and copper acetate, and copper chloride. In addition, examples of the organic catalyst include triethoxyphosphine.

Further, in order to obtain the compound (A1) having a desired structure, another olefin compound may be used instead of ethylene.

In the compound (B1), $R^{11}$ is a substituent to be introduced into the compound (A1) and the compound (A2), and can be appropriately selected and used according to the application of the compound (C1) and the compound (C2) to be obtained, and the like.

Examples of the hydrocarbon group in $R^{11}$ include a hydrocarbon group which may have a substituent or a heteroatom or other bonds ($B^1$) in the carbon chain.

Examples of the hydrocarbon group include an aliphatic hydrocarbon group (linear alkyl group, branched alkyl group, cycloalkyl group, and the like), an aromatic hydrocarbon group (phenyl group and the like), and a group consisting of combinations thereof. The aliphatic hydrocarbon group may have a double bond or a triple bond in the carbon chain. Examples of the combination include a group in which an alkylene group and an aryl group are directly linked via a heteroatom or other bonds.

Examples of the substituent that the hydrocarbon group may have include a halogen atom, a hydroxy group, an amino group, a nitro group, and a sulfo group, and from the viewpoint of the stability of the compound in the present production method, a halogen atom is preferable. Examples of the halogen atom include a fluorine atom, a chlorine atom, and a bromine atom.

Specific examples of the heteroatom or other bonds include the same ones as those mentioned above for $B^1$.

When another substituent is further introduced using the obtained compound (C1) or compound (C2) as a raw material, as an example, $R^{11}$ is preferably an alkyl group having a double bond. When $R^{11}$ is an alkyl group having a double bond, it is possible to suitably obtain the compound (C1) or compound (C2) into which a double bond is introduced, into which another substituent is easily introduced, while suppressing side reactions in the present production method.

Among them, a substituent represented by the following formula (D1) is preferable as $R^{11}$.

$$(CH_2{=}CH{-}R^{21}{-})_a(R^{22}{-})_{3-a}C{-}R^{23}{-}* \qquad \text{Formula (D1)}$$

where, in the formula, $R^{21}$ is a single bond or an alkylene group which may have a fluorine atom having 1 to 18 carbon atoms, and when there are a plurality of $R^{21}$'s, the $R^{21}$'s may be the same as or different from each other, $R^{22}$ is a hydrogen atom or an alkyl group which may have a fluorine atom having 1 to 10 carbon atoms, and when there are a plurality of $R^{22}$'s, the $R^{22}$'s may be the same as or different from each other, $R^{23}$ is a single bond or an alkylene group having 1 to 19 carbon atoms, a is an integer of 1 to 3, and

* is an atomic bond.

The group represented by ($CH_2{=}CH{-}R^{21}{-}$) may contain an isomerized structure. For example, when the group represented by ($CH_2{=}CH{-}R^{21}{-}$) is a group represented by $CH_2{=}CH{-}CH_2{-}$, a group represented by $CH_3CH{=}CH{-}$ may be contained.

In addition, when a of the group represented by $(CH_2{=}CH{-}R^{21}{-})_a$ is 2 or more, each of the groups may be the same as or different from each other.

The number of carbon atoms of $R^{21}$ may be 1 to 18, and is preferably 1 to 8.

$R^{12}$ is a halogen atom or a hydrocarbon group which may have a substituent or a heteroatom.

From the viewpoint of reactivity, the halogen atom in $R^{12}$ is preferably a chlorine atom, a bromine atom, or an iodine atom, and more preferably a chlorine atom or a bromine atom.

Examples of the hydrocarbon group in $R^{12}$ include those similar to those in the $R^{11}$. In addition, when $R^{12}$ is a hydrocarbon group, $R^{12}$ may be introduced instead of $R^1$ in the reaction in the present production method, and for example, the following compounds (C3) to (C6) and the like may be generated.

$$G^1{-}L^1{-}CR^1R^2{-}R^{12} \qquad \text{Formula (C3)}$$

$$R^{11}{-}CR^3R^4{-}L^2{-}G^2{-}L^3{-}CR^5R^6{-}R^{12} \qquad \text{Formula (C4)}$$

$$R^{12}{-}CR^3R^4{-}L^2{-}G^2{-}L^3{-}CR^5R^6{-}R^{12} \qquad \text{Formula (C5)}$$

$$R^{11}{-}R^{12} \qquad \text{Formula (C6)}$$

where, each reference sign in the formula is as described above.

In this regard, the following correspondence can be made.

By having $R^{11}$ and $R^{12}$ as substituents having the same structure, the compounds (C3) to (C5) as by-products are the same compounds as the compound (C1) or (C2).

When $R^{12}$ is a substituent lower in reactivity than $R^{11}$, generation of the compounds (C3) to (C5) as by-products can be suppressed. For example, when $R^{11}$— is a substituent represented by $R^{31}{-}CH_2{-}$ (where $R^{31}$ is a hydrocarbon group) and $R^{12}$— is a substituent represented by $R^{31}{-}CR^{32}R^{33}{-}$ (where $R^{31}$ is a hydrocarbon group, $R^{32}$ and $R^{33}$ are each independently a hydrogen atom or an alkyl group, and at least one of them is an alkyl group), $R^{11}$ is preferentially introduced in the reaction by the present production method.

In addition, when the compounds (C3) to (C6) are produced, separation by column chromatography or the like may be performed as necessary, and a mixture containing the compounds (C3) to (C6) may be used as it is depending on the application of the compound (C1) or (C2).

These may be appropriately selected depending on the application of the compound (C1) or the compound (C2).

Preferred specific examples of the compound (B1) include the following compounds.

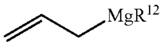
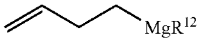
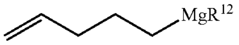
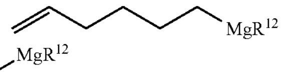
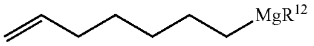
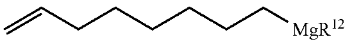
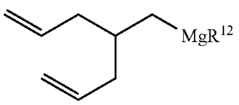
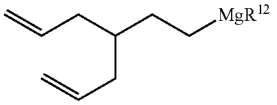
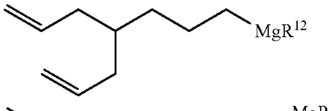
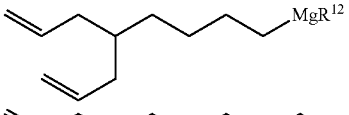
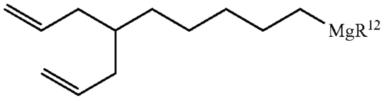

-continued

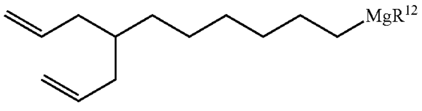
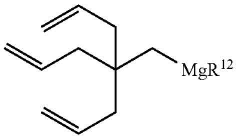
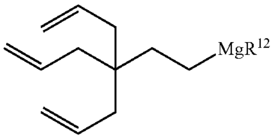
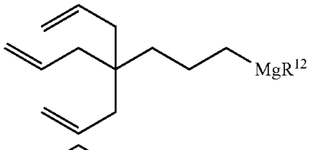
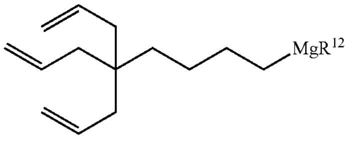
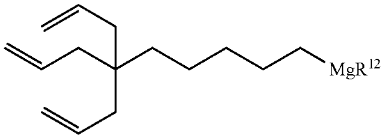
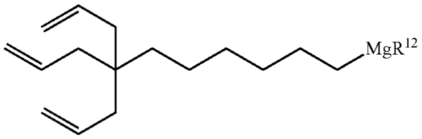
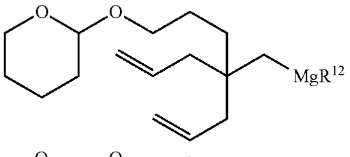
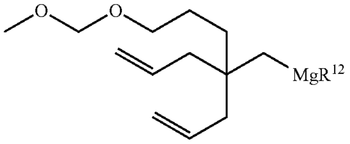
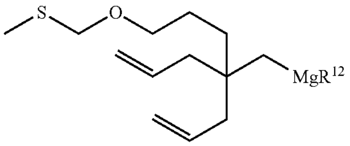
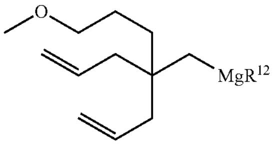
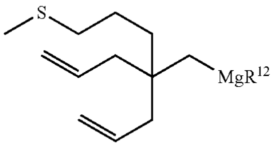
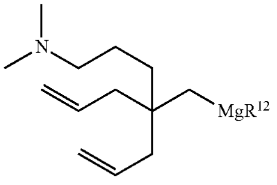
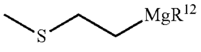

-continued

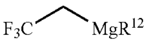
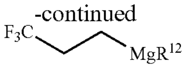
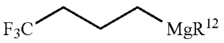
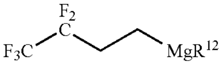
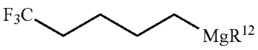
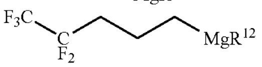
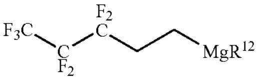
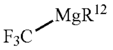
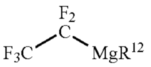
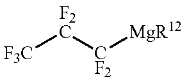
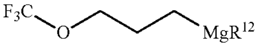
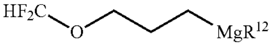
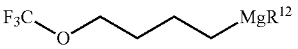
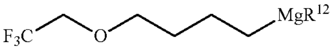
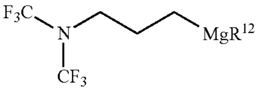
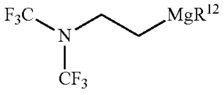
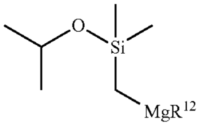
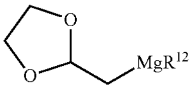
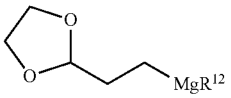
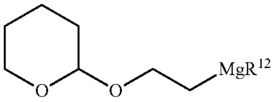
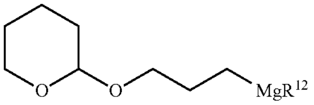
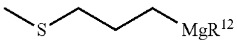

where, $R^{12}$ is as described above.

The compound (B1) can be produced, for example, by reacting the following formula (B1-1) with metallic magnesium, and further reacting the following formula (B1-2) as necessary. In addition, a commercially available product having a desired structure may be used.

$R^{11}$—$X^5$ Formula (B1-1)

$R^{12a}$—$X^5$ Formula (B1-2)

where, $R^{11}$ is as described above, $R^{12a}$ a is a hydrocarbon group which may have a substituent or a heteroatom, and $X^5$ is a halogen atom.

The compound (B1-1) is reacted with metallic magnesium to obtain the compound (B1) in which $R^{12}$ is a halogen atom. By further using the compound (B1-2), the compound (B1) in which $R^{12}$ is a hydrocarbon group is obtained.

In the present production method, the amount of the compound (B1) used is preferably 1 equivalent to 30 equivalents, more preferably 1.2 equivalents to 20 equivalents, and still more preferably 1.5 equivalents to 10 equivalents, relative to the total amount of $X^1$ to $X^3$ contained in the compound (A1) or the compound (A2), from the viewpoint of improving the yield of the target product.

The transition metal compound can be appropriately selected and used from known catalysts. As the transition metal compound, a compound containing elements from groups 3 to 12 of the periodic table as transition metals is preferable, and among them, a compound containing elements from groups 8 to 11 is preferable. Among them, the elements from groups 8 to 11 preferably include one or more elements selected from copper, nickel, palladium, and cobalt, and more preferably include copper.

When the transition metal compound contains copper, the copper may be any of zerovalent, monovalent, divalent, and trivalent compounds, and among them, monovalent or divalent copper salts or complex salts are preferable from the viewpoint of catalytic ability. Further, copper chloride is more preferable from the viewpoint of easy availability and the like. As copper chloride, either CuCl or $CuCl_2$ can be suitably used. In addition, copper chloride may be an anhydride or a hydrate, but copper chloride anhydride is more preferable from the viewpoint of catalytic ability.

When the transition metal compound contains nickel, the nickel may be any of a zerovalent compound, a monovalent compound, a divalent compound, and a trivalent compound, and among them, zerovalent or divalent nickel salts or complex salts are preferable from the viewpoint of catalytic ability and stability. Further, nickel chloride ($NiCl_2$) is more preferable from the viewpoint of easy availability and the like. In addition, nickel chloride may be an anhydride or a hydrate, but nickel chloride anhydride is more preferable from the viewpoint of catalytic ability.

When the transition metal compound contains palladium, the palladium may be any of a zerovalent compound and a divalent compound, and among them, zerovalent or divalent palladium salts or complex salts are preferable from the viewpoint of catalytic ability and stability. Furthermore, tris(dibenzylideneacetone)dipalladium ($Pd_2(dba)_3$) and palladium acetate ($Pd(OAc)_2$) are more preferable from the viewpoint of easy availability and the like. In addition, tris(dibenzylideneacetone)dipalladium and palladium acetate may be anhydrides or hydrates, but tris(dibenzylideneacetone)dipalladium anhydride and palladium acetate anhydride are more preferable from the viewpoint of catalytic ability.

When the transition metal compound contains cobalt, the cobalt may be any of zerovalent, monovalent, divalent, and trivalent compounds, and among them, divalent or trivalent cobalt salts or complex salts are preferable from the viewpoint of catalytic ability. Furthermore, from the viewpoint of easy availability and the like, divalent cobalt chloride ($CoCl_2$) is more preferable. In addition, cobalt chloride may be an anhydride or a hydrate, but cobalt chloride anhydride is more preferable from the viewpoint of catalytic ability.

The amount of the transition metal compound used is, for example, 0.05 to 50 equivalents, preferably 0.1 to 30 equivalents, more preferably 0.15 to 20 equivalents, relative to the total amount of I that the compound (A1) or the compound (A2) has.

In the reaction of the present production method, a ligand may be used in combination with a transition metal compound as a catalyst as necessary. By using the ligand, the yield of the target product is improved. On the other hand, in the present production method, since a sufficient yield can be obtained without using a ligand, the ligand may not be used.

Examples of the ligand include 1,3-butadiene, tricyclohexylphosphine, 1,1-bis(diphenylphosphino)ferrocene phenylpropyne, and tetramethylethylenediamine (TMEDA). When a ligand is used, the amount used is preferably 0.01 and 2.0 equivalents, more preferably 0.1 to 1.2 equivalents, relative to the total number of I of the compound (A1) or the compound (A2) from the viewpoint of improving the yield of the target product.

In addition, the reaction of the present production method is usually performed in a solvent. The solvent can be appropriately selected and used from among solvents capable of dissolving the compound (A1) or the compound (A2) and the compound (B1). The solvent may be a single solvent or a mixed solvent of two or more solvents.

For example, the solvent is not particularly limited as long as the solvent is a solvent inert to the reaction, and as the solvent inert to the reaction, particularly, an ether-based solvent such as diethyl ether, tetrahydrofuran (THF), or dioxane is preferable due to high affinity with an ether chain, and tetrahydrofuran is more preferable.

In addition, for compounds having a relatively high fluorine atom content, such as the compound (A1) and the compound (A2), a fluorine-based solvent is more preferable, and a mixed solvent obtained by combining the ether-based solvent and the fluorine-based solvent is still more preferable.

Examples of the fluorine-based solvent include hydrofluorocarbons (1H,4H-perfluorobutane, 1H-perfluorohexane, 1,1,1,3,3-pentafluorobutane, 1,1,2,2,3,3,4-heptafluorocyclopentane, 2H,3H-perfluoropentane, and the like), hydrochlorofluorocarbons (3,3-dichloro-1,1,1,2,2-pentafluoropropane, 1,3-dichloro-1,1,2,2,3-pentafluoropropane (HCFC-225cb), and the like), hydrofluoroethers ($CF_3CH_2OCF_2CF_2H$(AE-3000), (perfluorobutoxy)methane, (perfluorobutoxy)ethane, and the like), hydrochlorofluoroolefins ((Z)-1-chloro-2,3,3,4,4,5,5-heptafluoro-1-pentene (HCFO-1437 dycc (Z) form), (E)-1-chloro-2,3,3,4,4,5,5-heptafluoro-1-pentene (HCFO-1437 dycc (E) form), (Z)-1-chloro-2,3,3-trifluoro-1-propene (HCFO-1233 yd (Z) form), (E)-1-chloro-2,3,3-trifluoro-1-propene (HCFO-1233 yd (E) form), and the like), and fluorine-containing aromatic compounds (perfluorobenzene, m-bis(trifluoromethyl)benzene (SR-solvent), p-bis(trifluoromethyl)benzene, and the like). Among them, hydrofluoroethers (for example, $CF_3CH_2OCF_2CF_2H$(AE-3000)) are preferable as the fluorine-based solvent.

Examples of the first production method include:

(I): a method of preparing a solution containing the compound (A1) or the compound (A2), adding a transition metal compound and a ligand as necessary, and then adding a separately prepared compound (B1);

(II) a method of preparing a solution containing the compound (B1), a transition metal compound, and a ligand as necessary, and then gradually adding the compound (A1) or the compound (A2), and the like. The method (II) is preferable from the viewpoint of suppressing by-products and improving the yield of the compound (C1) or the compound (C2) to be obtained.

The reaction temperature between the compound (A1) or the compound (A2) and the compound (B1) may be appropriately adjusted according to the combination of the compound (A1) or the compound (A2) and the compound (B1). For example, the temperature may be −20° C. to 66° C. (boiling point of tetrahydrofuran), and is preferably −25° C. to 60° C.

<Second Production Method>

A second production method of a fluorine-containing compound of the present invention is a method for producing a fluorine-containing compound represented by the following formula (C1) or (C2), the method including:

reacting a compound represented by the following formula (A3) or (A4) with a compound represented by the following formula (B2).

$G^1\text{-}L^1\text{-}CR^1R^2—MgR^{12}$ Formula (A3)

$R^{12}Mg—CR^3R^4\text{-}L^2\text{-}G^2\text{-}L^3\text{-}CR^5R^6—MgR^{12}$ Formula (A4)

$R^1—X^4$ Formula (B2)

$G^1\text{-}L^1\text{-}CR^1R^2—R^{11}$ Formula (C1)

$R^{11}—CR^3R^4\text{-}L^2\text{-}G^2\text{-}L^3\text{-}CR^5R^6—R^{11}$ Formula (C2)

where, $X^4$ is a halogen atom, and preferred embodiments are the same as $X^1$ to $X^3$. In addition, other reference signs in the formula are the same as those described in the first production method, and preferred embodiments are also the same.

The second production method is a method of synthesizing the compound (C1) or the compound (C2) by subjecting the compound (A3) or the compound (A4) that is an organomagnesium compound and the compound (B2) that is an organohalogen compound to a coupling reaction. In addition, the second production method is different from the first production method in that the compound (A3) and the compound (A4) having a (poly)oxyfluoroalkylene chain are organomagnesium compounds, and the compound (B2) having a substituent $R^{11}$ to be introduced is an organohalogen compound. Hereinafter, the second production method will be described, but the description of contents common to the first production method will be omitted here.

The compound (A3) and the compound (A4) can be produced, for example, by reacting each of the following formulae (A3-2) and (A4-2) with metallic magnesium, and further reacting the following formula (B1-2) as necessary. In addition, a commercially available product having a desired structure may be used.

$G^1\text{-}L^1\text{-}CR^1R^2—X^6$ Formula (A3-2)

$X^7—CR^3R^4\text{-}L^2\text{-}G^2\text{-}L^3\text{-}CR^5R^6—X^8$ Formula (A4-2)

$R^{12a}—X^9$ Formula (B1-2)

where, $X^6$ to $X^9$ are each independently a halogen atom, and the other reference signs in the formula are as described above.

Preferred specific examples of the compound (A3) and the compound (A4) include the following compounds.

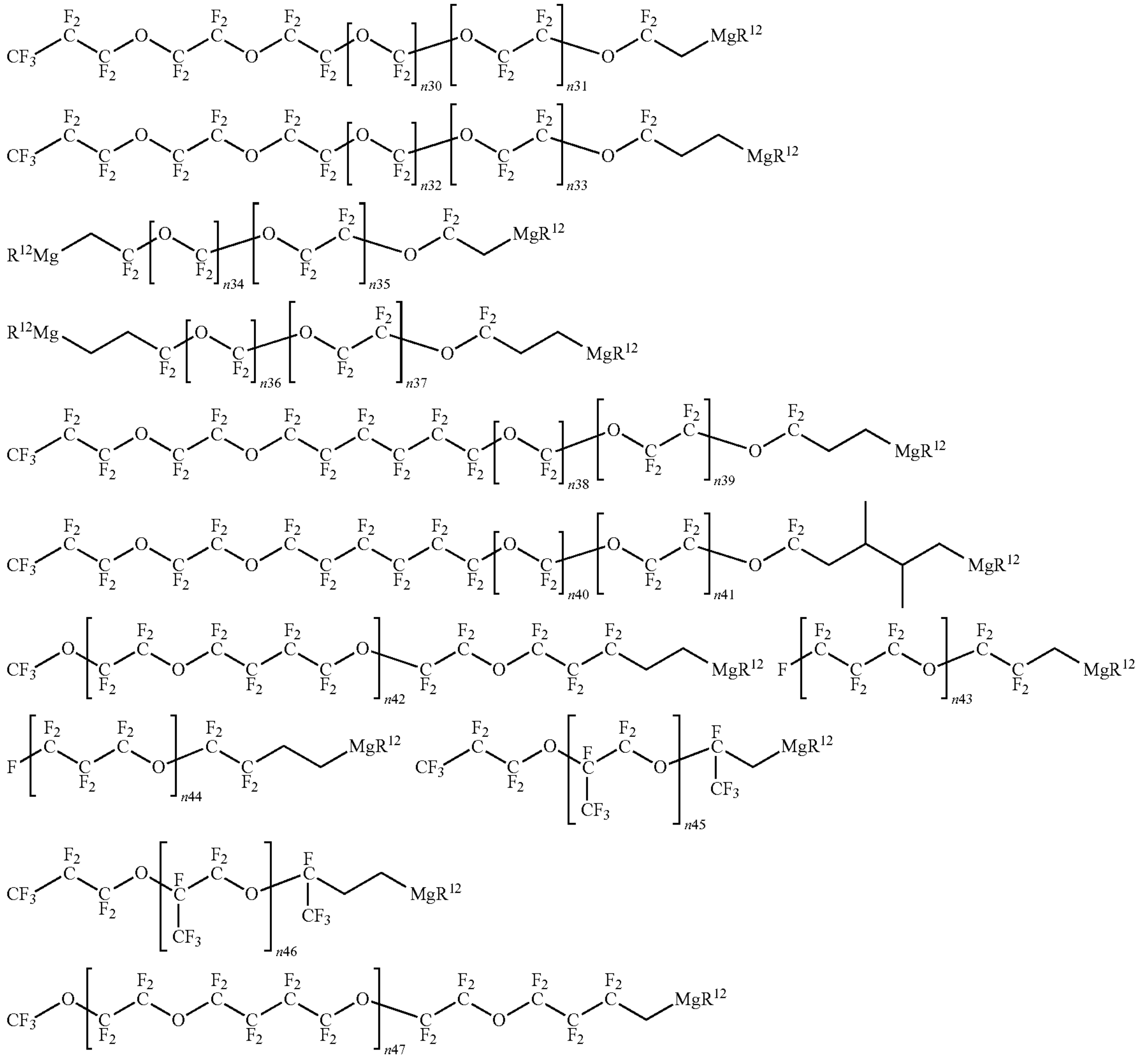

where, $R^{12}$ is as described above, and n30 to n47 represent the number of repeating units, and each independently represent an integer of 1 to 200.

The compound (B2) can be produced, for example, by a method of reacting the compound represented by the following formula (B2-2) with triphenylphosphine and iodomethane to iodinate the compound, a method of reacting the compound with triphenylphosphine and iodine to iodinate the compound, or the like. In addition, a commercially available product having a desired structure may be used.

$R^{11}$—OH Formula (B2-2)

where, $R^{11}$ in the formula is as described above.

Preferred specific examples of the compound (B2) include the following compounds.

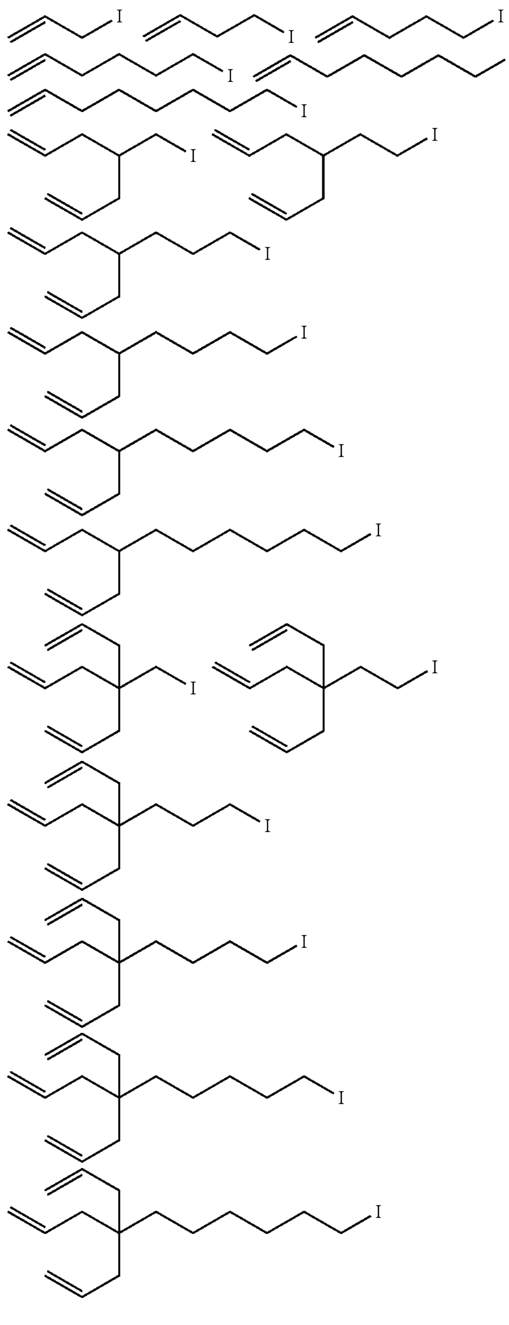

-continued

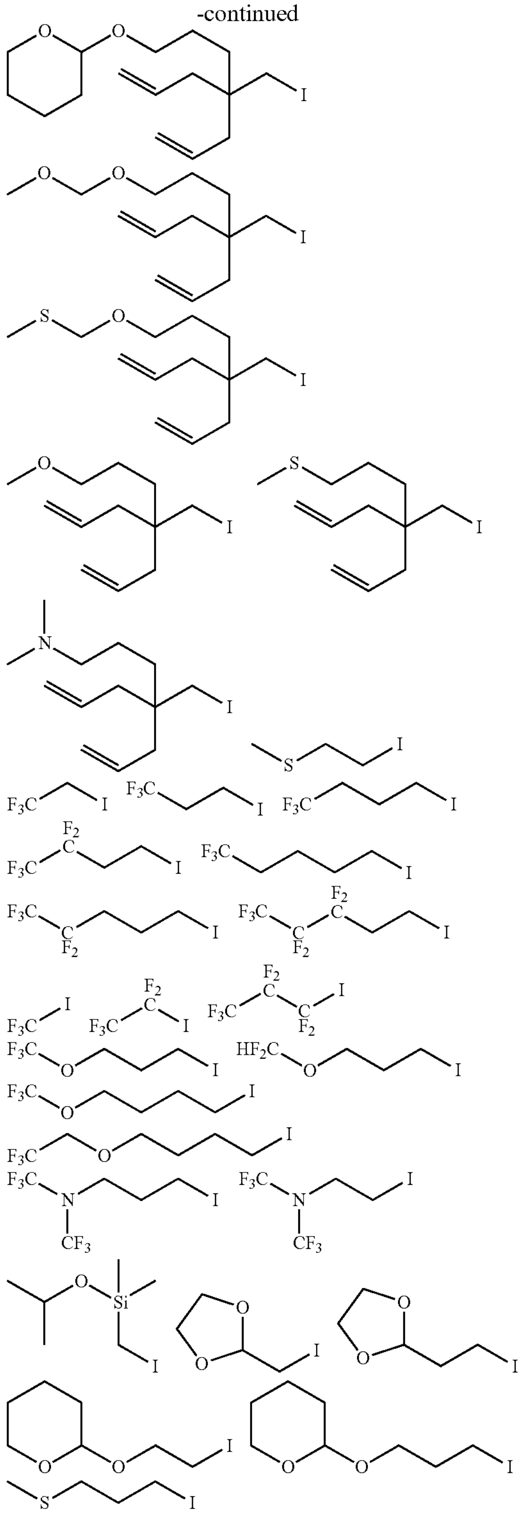

The ratio of the solvent, the catalyst, and the raw material, the reaction temperature, and the like in the second production method can be the same as those in the first production method, and preferred embodiments are also the same.

<Third Production Method>

A third production method of a fluorine-containing compound of the present invention is a method for producing a fluorine-containing compound represented by the following formula (C1) or (C2), the method including: reacting a compound represented by the following formula (A1) or (A2), a compound represented by the following formula (B2), and a compound represented by the following formula (B3) with each other.

$G^1\text{-}L^1\text{-}CR^1R^2—X^1$ Formula (A1)

$X^2—CR^3R^4\text{-}L^2\text{-}G^2\text{-}L^3\text{-}CR^5R^6—X^3$ Formula (A2)

$R^{11}—X^4$ Formula (B2)

$R^{14}—CR^{15}R^{16}—MgR^{12}$ Formula (B3)

$G^1\text{-}L^1\text{-}CR^1R^2—R^{11}$ Formula (C1)

$R^{11}—CR^3R^4\text{-}L^2\text{-}G^2\text{-}L^3\text{-}CR^5R^6—R^{11}$ Formula (C2)

where, each reference sign in the formula is as described above, and $R^{14}$, $R^{15}$, and $R^{16}$ are each independently a hydrogen atom or a hydrocarbon group which may have a substituent or a heteroatom.

In the third production method, various reaction routes are presumed, but in the main reaction, it is presumed that an exchange reaction between $X^4$ of the compound (B2) and $MgR^{12}$ of the compound (B3) occurs first, and then a coupling reaction with the compound (A1) or the compound (A2) proceeds to synthesize the compound (C1) or the compound (C2).

Hereinafter, the third production method will be described, but the description of contents common to the first or second production method will be omitted here.

Examples of the hydrocarbon group in $R^{14}$, $R^{15}$, and $R^{16}$ include the same groups as those in $R^{11}$. Among them, from the viewpoint that the exchange reaction between $X^4$ of the compound (B2) and $MgR^{12}$ of the compound (B3) is likely to occur, at least two of $R^{14}$, $R^{15}$, and $R^{16}$ are preferably a hydrocarbon group which may have a substituent or a heteroatom. When a carbon atom directly bonded to Mg is bonded to two or more alkyl groups, direct coupling reaction with the compound (A1) or the compound (A2) can be suppressed.

The ratio of the solvent, the catalyst, and the raw material, the reaction temperature, and the like in the third production method can be the same as those in the first production method, and preferred embodiments are also the same.

As described above, the compound (C1) or the compound (C2) in which various substituents are introduced into the (poly)oxyfluoroalkylene chain is obtained by the first to third production methods. Fluorine-containing compounds are excellent in various properties such as low refractive index, low dielectric constant, water/oil repellency, heat resistance, chemical resistance, chemical stability, and transparency, and can be used in various fields such as electric and electronic materials, semiconductor materials, optical materials, and surface treatment agents.

In addition, a surface treatment agent can also be produced by introducing a reactive silyl group into the compound (C1) or the compound (C2) obtained by the first to third production methods. The fluorine-containing compound having a (poly)oxyfluoroalkylene chain and a hydrolyzable silyl group can form a surface layer exhibiting high lubricity, water/oil repellency, and the like on the surface of the substrate, and thus is suitably used as a surface treatment agent.

The method for introducing a reactive silyl group into the compound (C1) or (C2) may be appropriately selected according to the substituent of the compound (C1) or the compound (C2). As an example, when the compound (C1) or the compound (C2) has a double bond, the compound (C1) or the compound (C2) can be introduced by subjecting the double bond and the following compound (E1) or (E2) to a hydrosilylation reaction.

$HSi(R^{40})_{3-c}(L)_c$ Formula (E1)

$HSi(R^{41})_{3-k}[—(OSi(R^{42})_2)_p—O—Si(R^{40})_{3-c}(L)_c]_k$ Formula (E2)

where, in the formula, $R^{40}$ is an alkyl group, and when there are a plurality of $R^{40}$'s, the $R^{40}$'s may be the same as or different from each other, L is a hydrolyzable group or a hydroxyl group, and a plurality of L's may be the same as or different from each other, $R^{41}$ is an alkyl group, and when there are a plurality of $R^{41}$'s, the $R^{41}$'s may be the same as or different from each other, $R^{42}$ is an alkyl group, a phenyl group, or an alkoxy group, and two $R^{42}$'s may be the same or different;

c is 2 or 3, k is 2 or 3, and p is an integer of 0 to 5, and when p is two or more, two or more $(OSi(R^{42})_2)$'s may be the same as or different from each other.

In addition, the compound (E2) can be produced, for example, by the method described in the specification of International Patent Publication No. WO 2019/208503.

In the compounds (C1) and (C2), when $R^{11}$ is a group represented by the formula (D1), a surface treatment agent represented by the following formula is obtained.

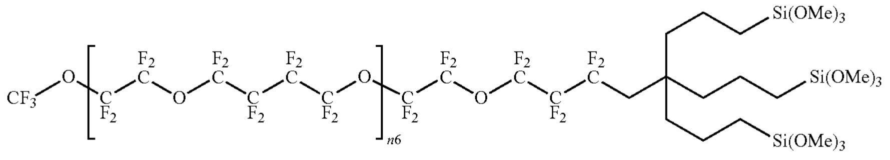

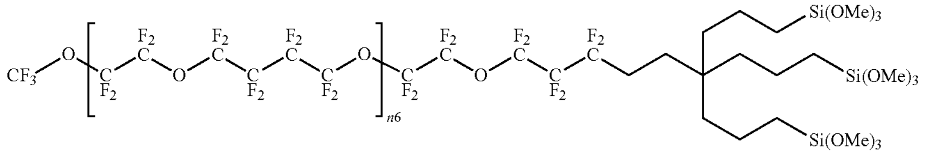

-continued
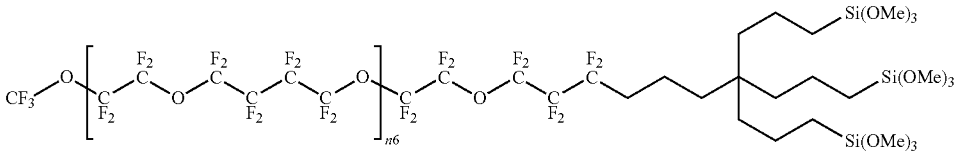
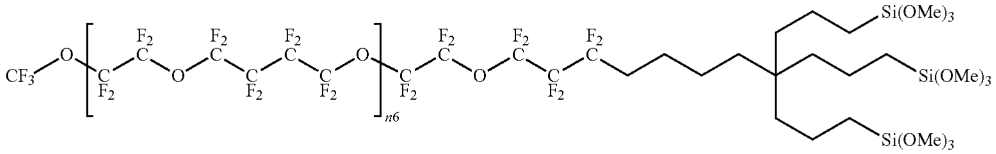
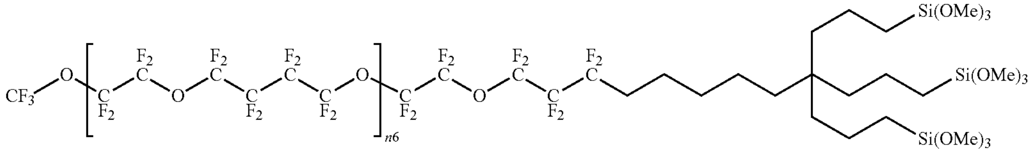
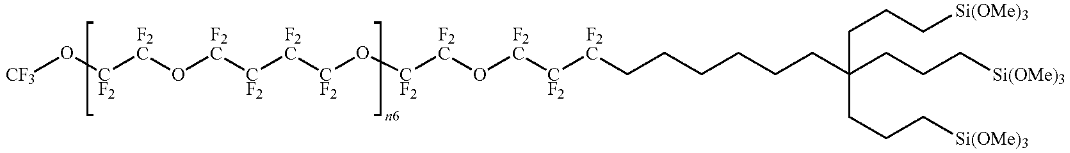
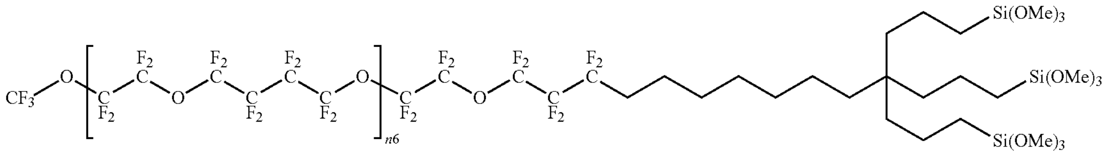
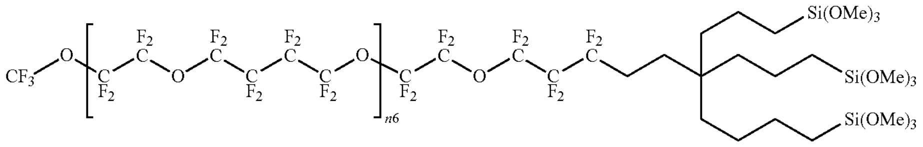
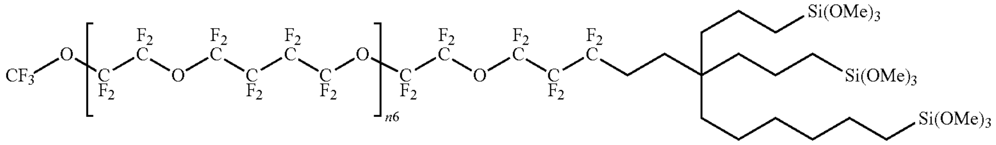
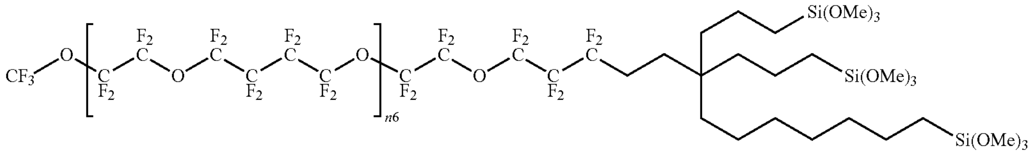
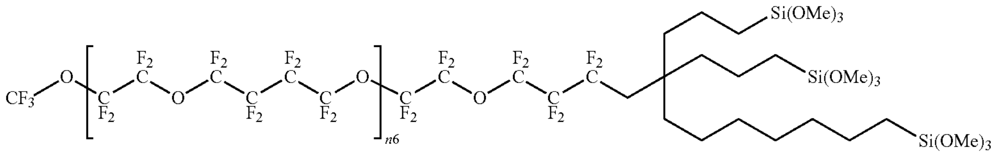
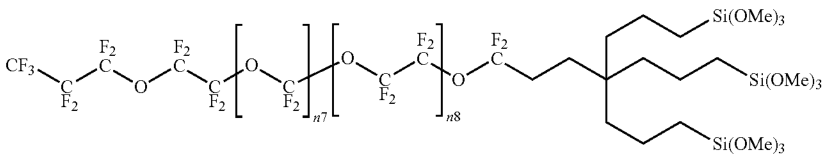
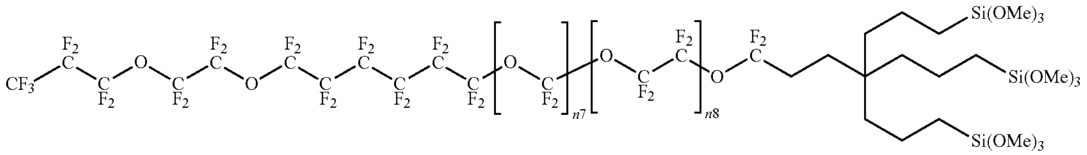

-continued
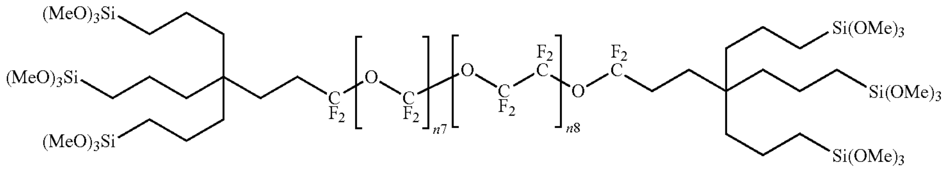
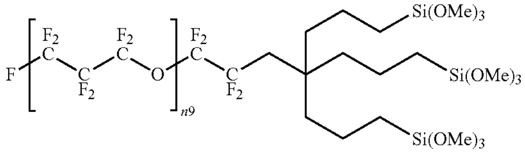
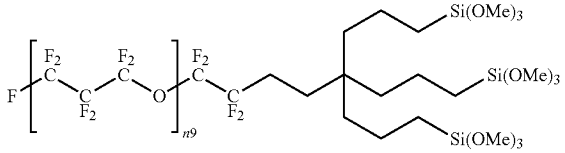
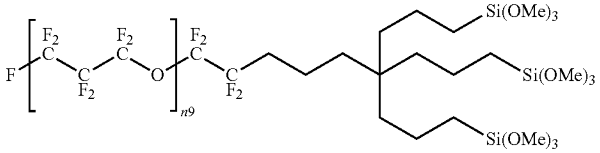
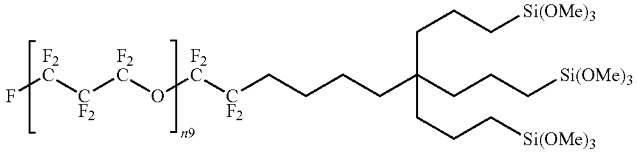
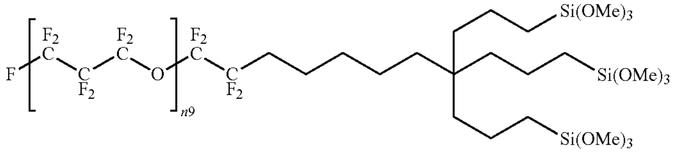
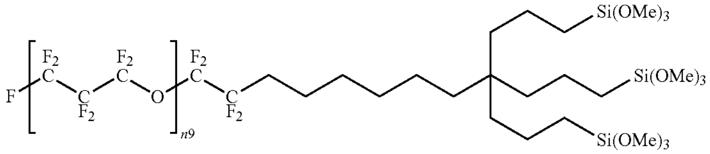
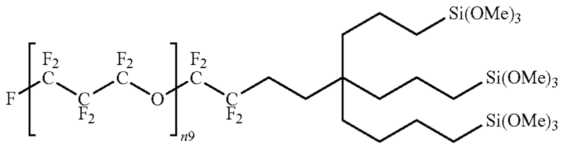
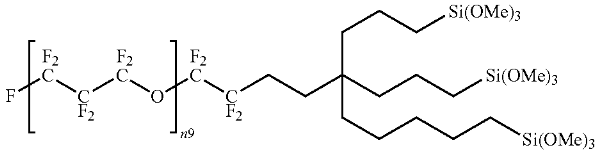
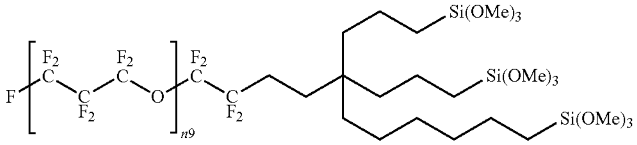
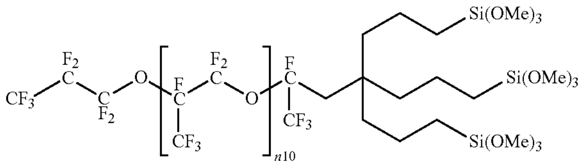
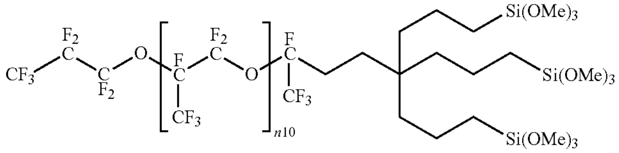

-continued

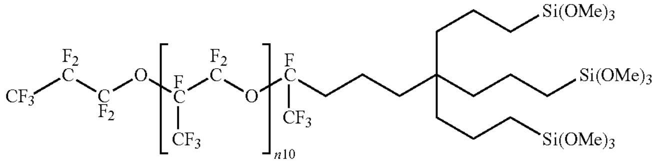

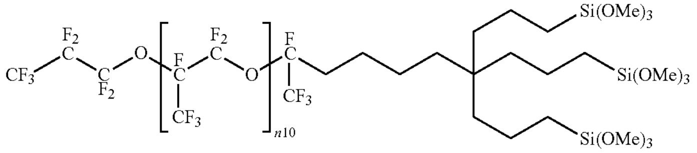

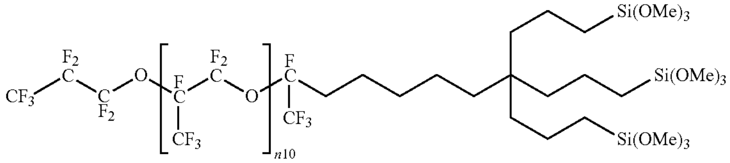

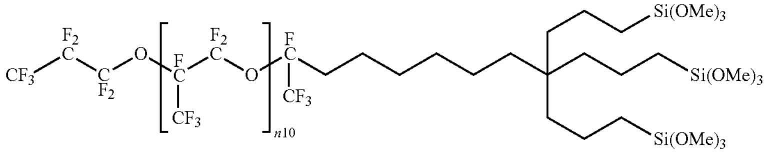

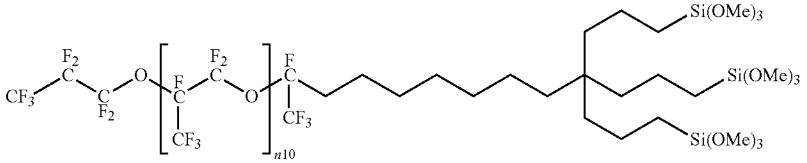

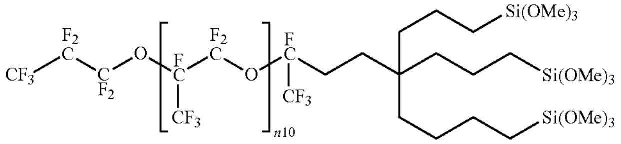

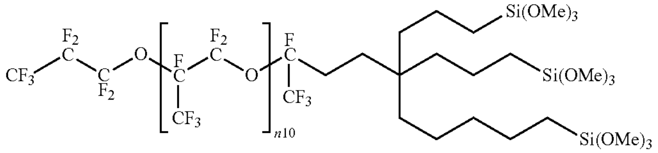

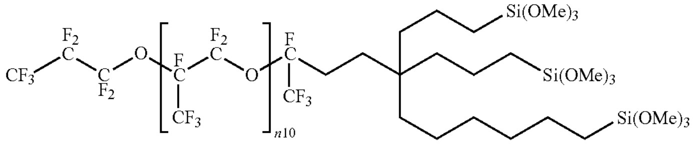

In addition, n6 to n10 in the formula represent the number of repeating units, and each independently represent an integer of 1 to 200.

The reactive silyl group is a group in which one or both of a hydrolyzable group and a hydroxyl group are bonded to a silicon atom. The hydrolyzable group is a group that becomes a hydroxyl group by a hydrolysis reaction. That is, the hydrolyzable silyl group becomes a silanol group (Si—OH) by a hydrolysis reaction. The silanol group further undergoes a dehydration condensation reaction between molecules to form a Si—O—Si bond. In addition, the silanol group undergoes a dehydration condensation reaction with a hydroxyl group (substrate —OH) on the surface of the substrate to form a chemical bond (substrate —O—Si).

Examples of the hydrolyzable group include an alkoxy group, a halogen atom, an acyl group, and an isocyanate group. The alkoxy group is preferably an alkoxy group having 1 to 6 carbon atoms. The halogen atom is preferably a chlorine atom.

The hydrolyzable group is preferably an alkoxy group or a halogen atom from the viewpoint of ease of production. As the hydrolyzable group, an alkoxy group having 1 to 4 carbon atoms is preferable from the viewpoint of having less outgassing at the time of coating and being excellent in storage stability of the present compound, an ethoxy group is particularly preferable when long-term storage stability of the present compound is required, and a methoxy group is particularly preferable when the reaction time after coating the substrate with the surface treatment agent is shortened.

Examples of the substrate include substrates required to be imparted with water/oil repellency. Examples thereof include other articles (for example, stylus), substrates that may be used by being brought into contact with human fingers, substrates that may be held by human fingers during operation, and substrates that may be placed on other articles (for example, placing tables).

Examples of the material of the substrate include metal, resin, glass, sapphire, ceramic, stone, and composite materials thereof. The glass may be chemically strengthened. A base film such as a $SiO_2$ film may be formed on the surface of the substrate.

As the substrate, a substrate for a touch panel, a substrate for a display, and a spectacle lens are preferred, and a substrate for a touch panel is particularly preferred. The material of the substrate for a touch panel is preferably glass or a transparent resin.

In addition, as the substrate, glass or a resin film used for an exterior part (excluding a display unit) in a device such as a mobile phone (for example, a smartphone), a portable information terminal (for example, a tablet terminal), a game machine, or a remote controller is also preferable.

The surface treatment agents containing the fluorine-containing compound are suitably used for applications in which it is required to maintain performance (friction resistance) in which water/oil repellency is less likely to decrease even when the surface layer is repeatedly rubbed with a finger and performance (fingerprint dirt removability) in which a fingerprint attached to the surface layer can be easily removed by wiping, for a long period of time, for example, as a surface treatment agent for a member constituting a surface touched by a finger of a touch panel, a spectacle lens, and a display of a wearable terminal.

EXAMPLES

Hereinafter, the present invention will be described in detail using examples, but the present invention is not limited to these examples. Note that Examples 1 to 20 are examples.

Example 1

Synthesis Example 1-1: Synthesis of Compound (1-1)

The following compound (1-1) was obtained according to the method described in Example 11 of International Patent Publication No. WO 2013/121984.

$$CF_3—O—(CF_2CF_2O—CF_2CF_2CF_2CF_2O)_n(CF_2CF_2O)—CF_2CF_2CF_2—CH_2CH_2I$$ Formula (1-1)

The average value of the number of repeating units n is 13.

Synthesis Example 1-2: Synthesis of Compound (2-1)

Diethyl Diallylmalonate (60.0 g), lithium chloride (23.7 g, 559 mmol), water (6.45 g, 360 mmol), and dimethyl sulfoxide (263 g) were added, and the mixture was stirred at 160° C. After cooling to room temperature, water was added, and the mixture was extracted with ethyl acetate. Hexane was added to the organic layer, washed with saturated saline, and dried over sodium sulfate. After the filtration, the solvent was distilled off to obtain 39.5 g of the following compound (2-1).

Formula (2-1)

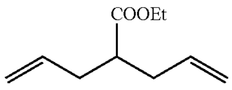

NMR spectrum of the compound (2-1);

$^1$H-NMR (400 MHz, Chloroform-d) δ(ppm): (ddt, J=17.1, 10.1, 7.0 Hz, 2H), 5.06 to 4.94 (m, 4H), 4.09 (q, J=7.1 Hz, 2H), 2.47 (ddd, J=14.0, 8.0, 6.1 Hz, 1H), 2.33 (dt, J=14.9, 7.5 Hz, 2H), 2.22 (dt, J=14.1, 6.5 Hz, 2H), 1.21 (t, J=7.1 Hz, 3H).

Synthesis Example 1-3: Synthesis of Compound (2-2)

THF (260 mL) and diisopropylamine (29.8 mL) were added, and then the solution was cooled to −78° C. An n-butyl lithium hexane solution (2.76 M, 96.6 mL) was added, and the temperature was raised to 0° C. After stirring, the mixture was cooled to −78° C. to prepare a THF solution of lithium diisopropylamide (LDA). The compound (2-1) (39.5 g) was added to the THF solution, and the mixture was stirred, then allyl bromide (24.1 mL) was added thereto. The temperature was raised to 0° C., 1 M hydrochloric acid (100 mL) was added, and THF was distilled off under reduced pressure. After extraction with dichloromethane, sodium sulfate was added. After the filtration, the solvent was distilled off, and flash column chromatography was performed using silica gel to obtain 45.0 g of the compound (2-2).

Formula (2-2)

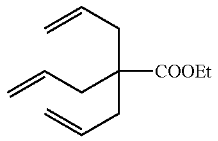

NMR spectrum of the compound (2-2);

$^1$H-NMR (400 MHz, Chloroform-d) δ(ppm): 5.74 to 5.62 (m, 3H), 5.04 (dd, J=13.6, 1.9 Hz, 6H), 4.10 (q, J=7.1 Hz, 2H), 2.29 (d, J=7.4 Hz, 6H), 1.22 (t, J=7.1 Hz, 3H).

Synthesis Example 1-4: Synthesis of Compound (2-3)

The compound (2-2) (45.0 g) was dissolved in THF (620 mL), and the solution was cooled to 0° C. A THF solution (104 mL) of lithium aluminum hydride was added thereto, and the mixture was stirred. Water and a 15% sodium hydroxide aqueous solution were added thereto, the mixture was stirred at room temperature, and then diluted with dichloromethane. After the filtration, the solvent was distilled off, and flash column chromatography was performed using silica gel to obtain 31.3 g of the following compound (2-3).

Formula (2-3)

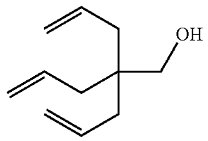

NMR spectrum of the compound (2-3);

$^1$H-NMR (400 MHz, Chloroform-d) δ(ppm): 5.90 to 5.76 (m, 3H), 5.10 to 5.02 (m, 6H), 3.38 (s, 2H), 2.03 (dt, J=7.5, 1.2 Hz, 6H), 1.45 (s, 1H).

Synthesis Example 1-5: Synthesis of Compound (3-1)

Acetonitrile (380 mL), the compound (2-3) (31.3 g), triphenylphosphine (64.3 g), and carbon tetrachloride (33.9 g) were added, and the mixture was stirred at 90° C. After concentration, ethyl acetate/hexane was added and stirred. After filtration and concentration, 28.2 g of the following compound (3-1) was obtained by distillation.

Formula (3-1)

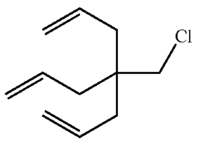

NMR spectrum of the compound (3-1);

$^1$H-NMR (400 MHz, Chloroform-d) δ(ppm): 5.83 to 5.67 (m, 3H), 5.16 to 5.01 (m, 6H), 3.32 (s, 2H), 2.05 (dt, J=7.5, 1.1 Hz, 6H).

Synthesis Example 1-6: Synthesis of Compound (3-2)

THF (35 mL) and iodine (0.180 g) were added to magnesium (2.36 g), and the mixture was stirred at room temperature. A THF (35 mL) solution of the compound (3-1) (14.0 g) was added thereto, and the mixture was heated and refluxed to prepare a solution (0.80 M) of the following compound (3-2).

Formula (3-2)

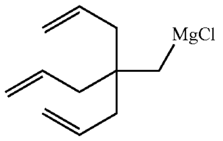

NMR spectrum of the compound (3-2);

$^1$H-NMR (400 MHz, Chloroform-d) δ(ppm): 5.88 (m, 3H), 5.11 (m, 6h), 1.85 (m, 6h), 1.22 (s, 2h).

Synthesis Example 1-7: Synthesis of Compound (1-2)

The compound (1-1) (1.03 g) was suspended in dehydrated THF (5 ml), copper chloride (0.0025 g) was added thereto, and the mixture was stirred at room temperature. The compound (3-2) (0.31 g) adjusted to 17% by wt was slowly added dropwise to the mixed solution, and then the mixture was stirred at 55° C. The mixed solution was cooled to room temperature, then water was added thereto, and the mixture was extracted with AE-3000 (5 ml), then sodium sulfate was added thereto. After filtration, the solvent was distilled off. Flash column chromatography was performed using silica gel to obtain a mixture containing the compound (1-2). It was confirmed by NMR measurement that the compound (1-2) was obtained with a selectivity of 84%.

Compound (1-2)

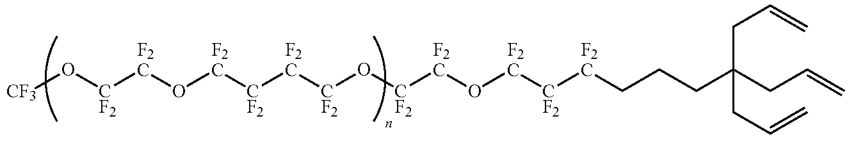

NMR spectrum of the compound (1-2);

$^1$H-NMR (400 MHz, Chloroform-d) δ(ppm): 5.80 (ddt, J=20.3, 9.3, 7.4 Hz, 3H), 5.01 (dd, J=13.5, 1.7 Hz, 6H), 2.13 to 2.01 (m, 2H), 1.97 (d, J=7.5 Hz, 6H), 1.67 to 1.55 (m, 2H), 1.27 to 1.18 (m, 2H).

$^{19}$F-NMR (376 MHz, Chloroform-d) δ(ppm): −55.25, −82.83, −88.06, −90.16 (d, J=8.1 Hz), −114.18, −125.26, −126.59.

Examples 2 to 20

The compound (1-2) was produced in the same manner as in Example 1, except that various conditions were changed as shown in the following Table 1 in Synthesis Example 1-7 of Example 1.

In addition, the equivalent is based on the compound (1-1). The raw material conversion rate is a rate at which the compound (1-1) is converted, and the target product selectivity is a rate at which the target compound (1-2) is selected from the compounds to be converted from the compound (1-1). The ligand can be used in a range of preferred equivalents as described above for the compound (1-1).

TABLE 1

| Example | Compound (3-2) Equivalent | Catalyst Type | Catalyst Equivalent | Ligand | Solvent | Temperature [° C.] | Reaction time [h] | Raw material conversion rate [%] | Target product selectivity [%] |
|---|---|---|---|---|---|---|---|---|---|
| 1 | 4.0 | $CuCl_2$ | 0.3 | none | THF | 55 | 5 | 100 | 84 |
| 2 | 4.0 | $CuCl_2$ | 0.3 | none | AE-3000 | 55 | 5 | 100 | 45 |
| 3 | 2.5 | $CuCl_2$ | 0.05 | none | AE-3000 | 55 | 3 | 100 | 87 |
| 4 | 5.9 | $Pd_2(dba)_3$ | 0.19 | none | AE-3000 | 60 | 19 | 100 | 52 |
| 5 | 5.5 | $Pd_2(dba)_3$ | 0.28 | none | THF | 60 | 19 | 100 | 64 |
| 6 | 5.8 | $Pd(OAc)_2$ | 0.38 | none | AE-3000 | 60 | 19 | 100 | 56 |
| 7 | 5.4 | $Pd(OAc)_2$ | 0.44 | none | THF | 60 | 19 | 100 | 47 |

TABLE 1-continued

| Example | Compound (3-2) Equivalent | Catalyst Type | Equivalent | Ligand | Solvent | Temperature [° C.] | Reaction time [h] | Raw material conversion rate [%] | Target product selectivity [%] |
|---|---|---|---|---|---|---|---|---|---|
| 8 | 6.1 | $Pd(OAc)_2$ | 0.5 | PCy3 | THF | 60 | 21 | 100 | 30 |
| 9 | 5.7 | $Pd(OAc)_2$ | 0.76 | PCy3 | AE-3000 | 60 | 21 | 100 | 44 |
| 10 | 4.0 | $CoCl_2$ | 0.5 | 1.3-butadiene | AE-3000 | 60 | 20 | 100 | 41 |
| 11 | 5.2 | $CoCl_2$ | 0.7 | 1.3-butadiene | THF | 60 | 20 | 100 | 28 |
| 12 | 4.0 | $NiCl_2$ | 0.3 | 1.3-butadiene | AE-3000 | 55 | 5 | 100 | 46 |
| 13 | 4.0 | $NiCl_2$ | 0.3 | 1.3-butadiene | THF | 55 | 5 | 100 | 60 |
| 14 | 4.0 | $NiCl_2$ | 0.3 | dppf | AE-3000 | 55 | 5 | 100 | 40 |
| 15 | 4.0 | $NiCl_2$ | 0.3 | dppf | THF | 55 | 5 | 100 | 37 |
| 16 | 4.0 | $NiCl_2$ | 0.3 | PCy3 | AE-3000 | 55 | 5 | 100 | 41 |
| 17 | 4.0 | $NiCl_2$ | 0.3 | PCy3 | THF | 55 | 5 | 88 | 35 |
| 18 | 6.0 | none | — | none | THF | 0 | 21 | 39 | 31 |
| 19 | 6.0 | none | — | none | AE-3000 | 0 | 21 | 54 | 43 |
| 20 | 3.7 | none | — | none | AE-3000 | 55 | 5 | 100 | 36 |

In addition, abbreviations and the like in Table 1 are as follows.
$Pd_2(dba)_3$: tris(dibenzylideneacetone)dipalladium
$Pd(OAc)_2$: palladium acetate
$PCy_3$: tricyclohexylphosphine
dppf: 1,1'-ferrocenediyl-bis(diphenylphosphine)
AE-3000: $CF_3CH_2OCF_2CF_2H$
THF: tetrahydrofuran According to the present invention, a fluorine-containing compound used in various fields such as agricultural chemicals, pharmaceuticals, and functional materials can be synthesized under relatively mild reaction conditions using an easily available compound. In addition, for example, by using the compound (B1) having a carbon-carbon double bond, a double bond can be easily added to the compound (A1) or the compound (A2), and a compound useful as a raw material for synthesizing various compounds can be obtained.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A method for producing a fluorine-containing compound represented by the following formula (C1) or (C2), the method comprising: reacting a compound represented by the following formula (A1) or (A2) with a compound represented by the following formula (B1):

$G^1$-$L^1$-$CR^1R^2$—$X^1$ Formula (A1)

$X^2$—$CR^3R^4$-$L^2$-$G^2$-$L^3$-$CR^5R^6$—$X^3$ Formula (A2)

$R^{11}$—$MgR^{12}$ Formula (B1)

$G^1$-$L^1$-$CR^1R^2$—$R^{11}$ Formula (C1)

$R^{11}$—$CR^3R^4$-$L^2$-$G^2$-$L^3$-$CR^5R^6$—$R^{11}$ Formula (C2)

where, in the formula, $G^1$ is a monovalent group having a (poly)oxyfluoroalkylene chain, $G^2$ is a divalent group having a (poly)oxyfluoroalkylene chain, $L^1$, $L^2$, and $L^3$ are each independently a single bond or a divalent organic group, $R^1$, $R^2$, $R^3$, $R^4$, $R^5$, and $R^6$ are each independently a hydrogen atom or an alkyl group having 1 to 6 carbon atoms which may have a substituent, $R^{11}$ is a hydrocarbon group which may have a substituent or a heteroatom, and when there are a plurality of $R^{11}$'s, the $R^{11}$'s may be the same as or different from each other, $R^{12}$ is a halogen atom or a hydrocarbon group which may have a substituent or a heteroatom, and $X^1$, $X^2$, and $X^3$ are each independently a halogen atom.

2. A method for producing a fluorine-containing compound represented by the following formula (C1) or (C2), the method comprising: reacting a compound represented by the following formula (A3) or (A4) with a compound represented by the following formula (B2):

$G^1$-$L^1$-$CR^1R^2$—$MgR^{12}$ Formula (A3)

$R^{12}Mg$—$CR^3R^4$-$L^2$-$G^2$-$L^3$-$CR^5R^6$—$MgR^{12}$ Formula (A4)

$R^{11}$—$X^4$ Formula (B2)

$G^1$-$L^1$-$CR^1R^2$—$R^{11}$ Formula (C1)

$R^{11}$—$CR^3R^4$-$L^2$-$G^2$-$L^3$-$CR^5R^6$—$R^{11}$ Formula (C2)

where, in the formula, $G^1$ is a monovalent group having a (poly)oxyfluoroalkylene chain, $G^2$ is a divalent group having a (poly)oxyfluoroalkylene chain, $L^1$, $L^2$, and $L^3$ are each independently a single bond or a divalent organic group, $R^1$, $R^2$, $R^3$, $R^4$, $R^5$, and $R^6$ are each independently a hydrogen atom or an alkyl group having 1 to 6 carbon atoms which may have a substituent, $R^{11}$'s are each independently a hydrocarbon group which may have a substituent or a heteroatom, and when there are a plurality of $R^{11}$'s, the $R^{11}$'s may be the same as or different from each other, $R^{12}$ is a halogen atom or a hydrocarbon group which may have a substituent or a heteroatom, and when there are a plurality of $R^{12}$'s, the $R^{12}$'s may be the same as or different from each other, and $X^4$ is a halogen atom.

3. A method for producing a fluorine-containing compound represented by the following formula (C1) or (C2), the method comprising: reacting a compound represented by the following formula (A1) or (A2), a compound represented by the following formula (B2), and a compound represented by the following formula (B3) with each other:

$G^1$-$L^1$-$CR^1R^2$—$X^1$ Formula (A1)

$X^2$—$CR^3R^4$-$L^2$-$G^2$-$L^3$-$CR^5R^6$—$X^3$ Formula (A2)

$R^{11}$—$X^4$ Formula (B2)

$R^{14}$—$CR^{15}R^{16}$—$MgR^{12}$ Formula (B3)

$G^1$-$L^1$-$CR^1R^2$—$R^{11}$ Formula (C1)

$R^{11}$—$CR^3R^4$-$L^2$-$G^2$-$L^3$-$CR^5R^6$—$R^{11}$ Formula (C2)

where, in the formula, $G^1$ is a monovalent group having a (poly)oxyfluoroalkylene chain, $G^2$ is a divalent group having a (poly)oxyfluoroalkylene chain, $L^1$, $L^2$, and $L^3$ are each independently a single bond or a divalent organic group, $R^1$, $R^2$, $R^3$, $R^4$, $R^5$, and $R^6$ are each independently a hydrogen atom or an alkyl group having 1 to 6 carbon atoms which may have a substituent, $R^{11}$ is a hydrocarbon group which may have a substituent or a heteroatom, and when there are a plurality of $R^{11}$'s, the $R^{11}$'s may be the same as or different from each other, $R^{12}$ is a halogen atom or a hydrocarbon group which may have a substituent or a heteroatom, $R^{14}$, $R^{15}$, and $R^{16}$ are each independently a hydrogen atom or a hydrocarbon group which may have a substituent or a heteroatom, and $X^1$, $X^2$, $X^3$, and $X^4$ are each independently a halogen atom.

4. The method for producing a fluorine-containing compound according to claim 1, wherein at least one of the $L^1$-$CR^1R^2$, the $L^2$-$CR^3R^4$, and the $L^3$-$CR^5R^6$ is represented by $(CR^7R^8—CR^9R^{10})_{n1}$, where, in the formula, $R^7$, $R^8$, $R^9$, and $R^{10}$ are each independently a hydrogen atom or an alkyl group having 1 to 6 carbon atoms which may have a substituent, and when there are a plurality of $R^7$'s, $R^8$'s, $R^9$'s, and $R^{10}$'s, the $R^7$'s, $R^8$'s, $R^9$'s, and $R^{10}$'s may be the same as or different from each other, and n1 is an integer of 1 to 20.

5. The method for producing a fluorine-containing compound according to claim 2, wherein at least one of the $L^1$-$CR^1R^2$, the $L^2$-$CR^3R^4$, and the $L^3$-$CR^5R^6$ is represented by $(CR^7R^8—CR^9R^{10})_{n1}$, where, in the formula, $R^7$, $R^8$, $R^9$, and $R^{10}$ are each independently a hydrogen atom or an alkyl group having 1 to 6 carbon atoms which may have a substituent, and when there are a plurality of $R^7$'s, $R^8$'s, $R^9$'s, and $R^{10}$'s, the $R^7$'s, $R^8$'s, $R^9$'s, and $R^{10}$'s may be the same as or different from each other, and n1 is an integer of 1 to 20.

6. The method for producing a fluorine-containing compound according to claim 3, wherein at least one of the $L^1$-$CR^1R^2$, the $L^2$-$CR^3R^4$, and the $L^3$-$CR^5R^6$ is represented by $(CR^7R^8—CR^9R^{10})_{n1}$, where, in the formula, $R^7$, $R^8$, $R^9$, and $R^{10}$ are each independently a hydrogen atom or an alkyl group having 1 to 6 carbon atoms which may have a substituent, and when there are a plurality of $R^7$'s, $R^8$'s, $R^9$'s, and $R^{10}$'s, the $R^7$'s, $R^8$'s, $R^9$'s, and $R^{10}$'s may be the same as or different from each other, and n1 is an integer of 1 to 20.

7. The method for producing a fluorine-containing compound according to claim 1, wherein at least one of the $L^1$-$CR^1R^2$, the $L^2$-$CR^3R^4$, and the $L^3$-$CR^5R^6$ is represented by $(CH_2CH_2)_{n2}$, where, in the formula, n2 is an integer of 1 to 20.

8. The method for producing a fluorine-containing compound according to a claim 2, wherein at least one of the $L^1$-$CR^1R^2$, the $L^2$-$CR^3R^4$, and the $L^3$-$CR^5R^6$ is represented by $(CH_2CH_2)_{n2}$, where, in the formula, n2 is an integer of 1 to 20.

9. The method for producing a fluorine-containing compound according to claim 3, wherein at least one of the $L^1$-$CR^1R^2$, the $L^2$-$CR^3R^4$, and the $L^3$-$CR^5R^6$ is represented by $(CH_2CH_2)_{n2}$, where, in the formula, n2 is an integer of 1 to 20.

10. The method for producing a fluorine-containing compound according to claim 1, wherein the $R^{11}$ is represented by the following formula (D1):

$(CH_2{=}CH—R^{21}—)_a(R^{22}—)_{3-a}C—R^{23}—*$ Formula (D1)

where, in the formula, $R^{21}$ is a single bond or an alkylene group which may have a fluorine atom having 1 to 18 carbon atoms, and when there are a plurality of $R^{21}$'s, the $R^{21}$'s may be the same as or different from each other, $R^{22}$ is a hydrogen atom or an alkyl group which may have a fluorine atom having 1 to 10 carbon atoms, and when there are a plurality of $R^{22}$'s, the $R^{22}$'s may be the same as or different from each other, $R^{23}$ is a single bond or an alkylene group having 1 to 19 carbon atoms, a is an integer of 1 to 3, and

* is an atomic bond.

11. The method for producing a fluorine-containing compound according to claim 2, wherein the $R^{11}$ is represented by the following formula (D1):

$(CH_2{=}CH—R^{21}—)_a(R^{22}—)_{3-a}C—R^{23}—*$ Formula (D1)

where, in the formula, $R^{21}$ is a single bond or an alkylene group which may have a fluorine atom having 1 to 18 carbon atoms, and when there are a plurality of $R^{21}$'s, the $R^{21}$'s may be the same as or different from each other, $R^{22}$ is a hydrogen atom or an alkyl group which may have a fluorine atom having 1 to 10 carbon atoms, and when there are a plurality of $R^{22}$'s, the $R^{22}$'s may be the same as or different from each other, $R^{23}$ is a single bond or an alkylene group having 1 to 19 carbon atoms, a is an integer of 1 to 3, and

* is an atomic bond.

12. The method for producing a fluorine-containing compound according to claim 3, wherein the $R^{11}$ is represented by the following formula (D1):

$(CH_2{=}CH—R^{21}—)_a(R^{22}—)_{3-a}C—R^{23}—*$ Formula (D1)

where, in the formula, $R^{21}$ is a single bond or an alkylene group which may have a fluorine atom having 1 to 18 carbon atoms, and when there are a plurality of $R^{21}$'s, the $R^{21}$'s may be the same as or different from each other, $R^{22}$ is a hydrogen atom or an alkyl group which may have a fluorine atom having 1 to 10 carbon atoms, and when there are a plurality of $R^{22}$'s, the $R^{22}$'s may be the same as or different from each other, $R^{23}$ is a single bond or an alkylene group having 1 to 19 carbon atoms, a is an integer of 1 to 3, and

* is an atomic bond.

13. The method for producing a fluorine-containing compound according to claim 1, wherein at least one of the $X^1$, $X^2$, $X^3$, and $X^4$ is an iodine atom.

14. The method for producing a fluorine-containing compound according to claim 2, wherein at least one of the $X^1$, $X^2$, $X^3$, and $X^4$ is an iodine atom.

15. The method for producing a fluorine-containing compound according to claim 3, wherein at least one of the $X^1$, $X^2$, $X^3$, and $X^4$ is an iodine atom.

16. The method for producing a fluorine-containing compound according to claim 1, wherein the reaction is performed in the presence of a transition metal compound.

17. The method for producing a fluorine-containing compound according to claim 16, wherein the transition metal compound contains one or more elements selected from Cu, Ni, Pd, and Co.

18. A method for producing a surface treatment agent, comprising: producing a fluorine-containing compound represented by the formula (C1) or (C2) by the production method according to claim 1; and introducing a reactive silyl group into the fluorine-containing compound.

19. A method for producing a surface treatment agent, comprising: producing a fluorine-containing compound represented by the formula (C1) or (C2) by the production method according to claim 2; and introducing a reactive silyl group into the fluorine-containing compound.

20. A method for producing a surface treatment agent, comprising: producing a fluorine-containing compound represented by the formula (C1) or (C2) by the production method according to claim 3; and introducing a reactive silyl group into the fluorine-containing compound.

* * * * *